Figure 8:
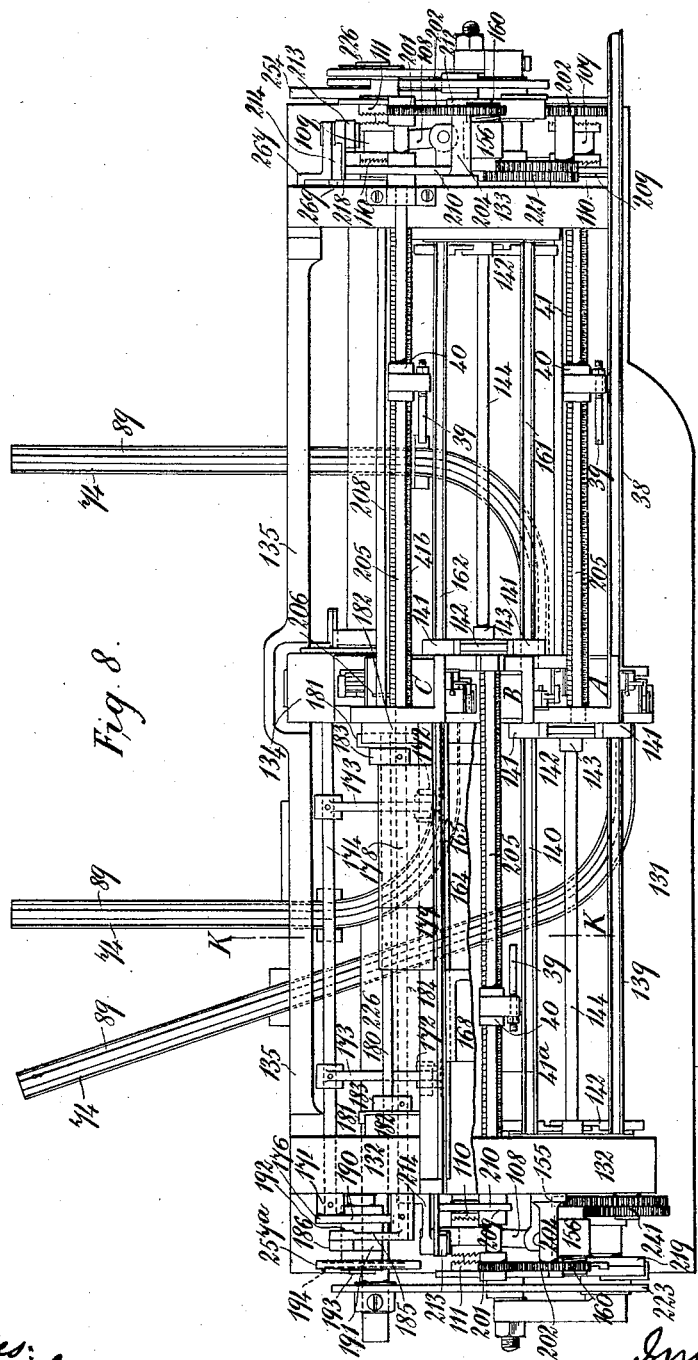

E. A. ADCOCK.
MACHINE OR APPARATUS FOR THE AUTOMATIC JUSTIFICATION OF LINES OF TYPE.
APPLICATION FILED NOV. 12, 1910.
1,008,936.
Patented Nov. 14, 1911.
15 SHEETS—SHEET 1.
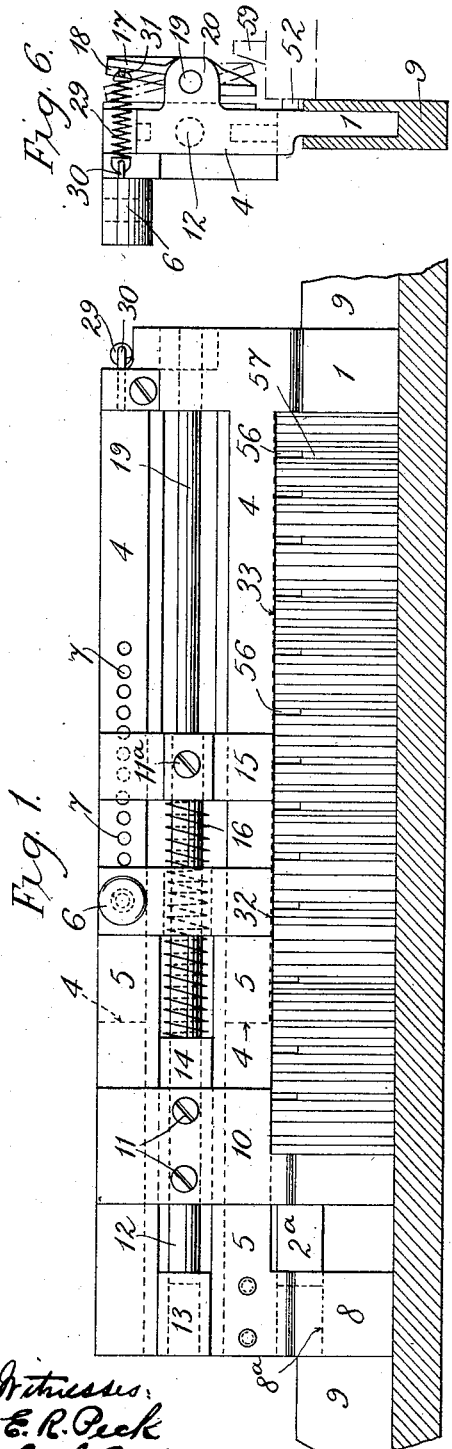
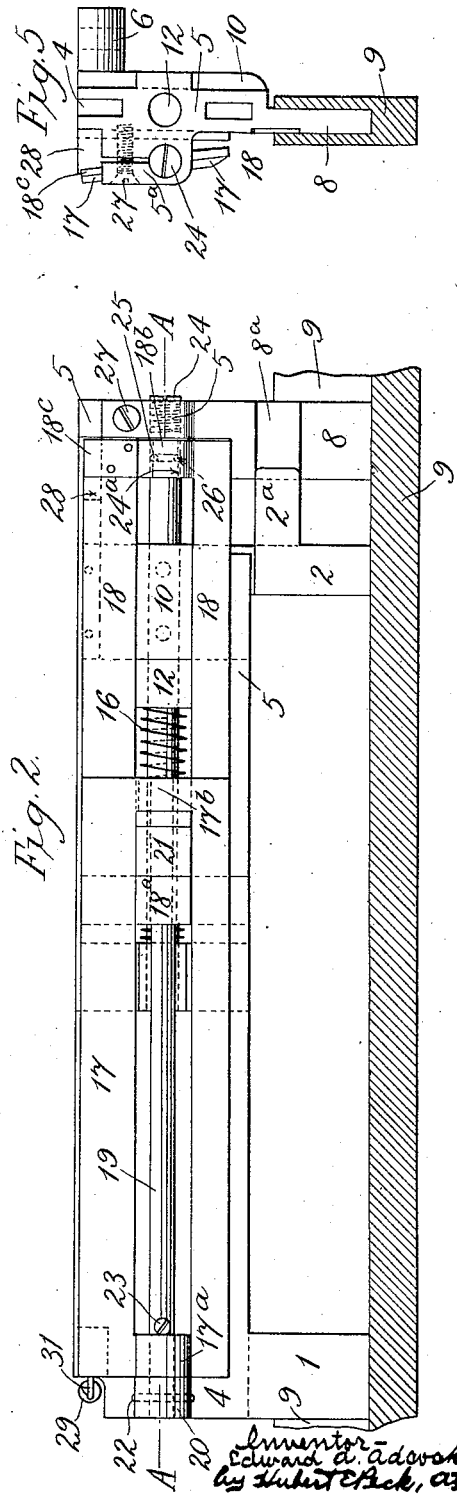
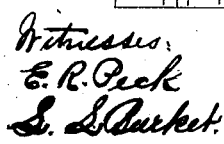

E. A. ADCOCK.
MACHINE OR APPARATUS FOR THE AUTOMATIC JUSTIFICATION OF LINES OF TYPE.
APPLICATION FILED NOV. 12, 1910.
1,008,936.
Patented Nov. 14, 1911.
15 SHEETS—SHEET 2.
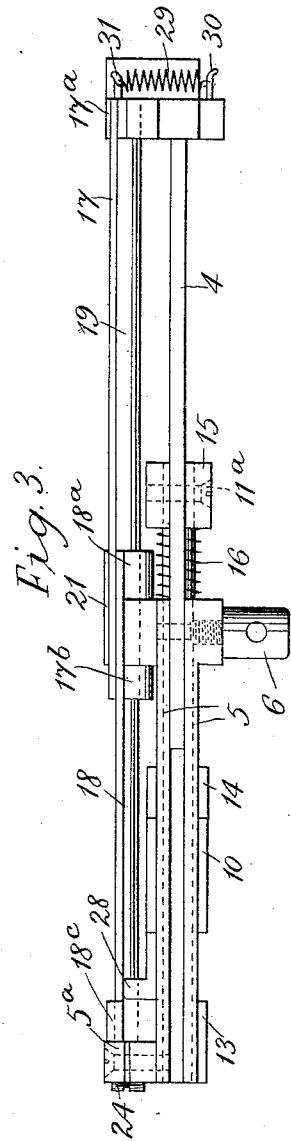
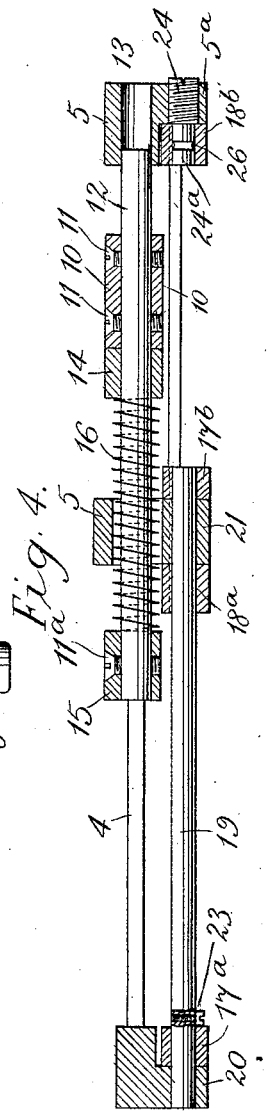

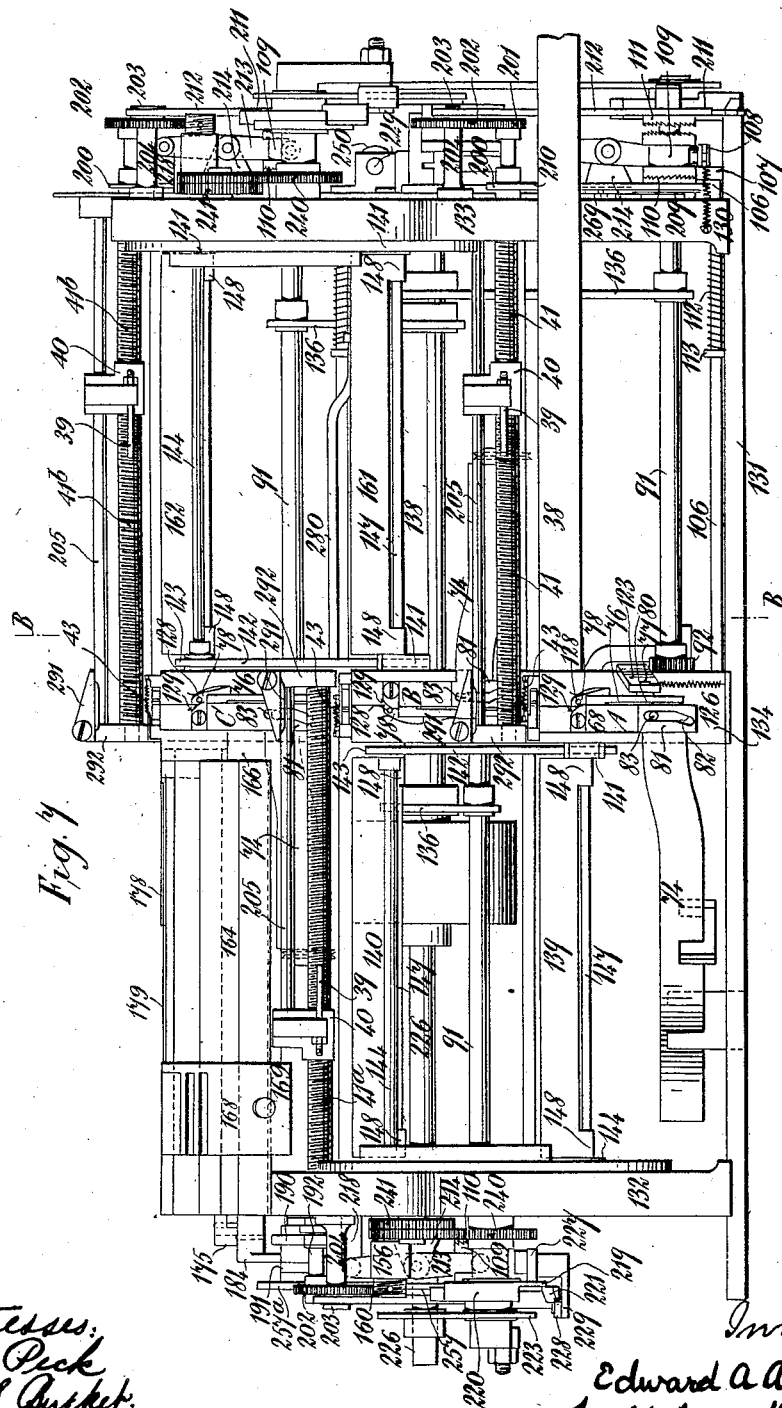

E. A. ADCOCK.
MACHINE OR APPARATUS FOR THE AUTOMATIC JUSTIFICATION OF LINES OF TYPE.
APPLICATION FILED NOV. 12, 1910.

1,008,936.

Patented Nov. 14, 1911.

15 SHEETS—SHEET 4.

Witnesses:
E. R. Peck
L. L. Burket

Inventor:
Edward A. Adcock
by Hubert E. Peck atty

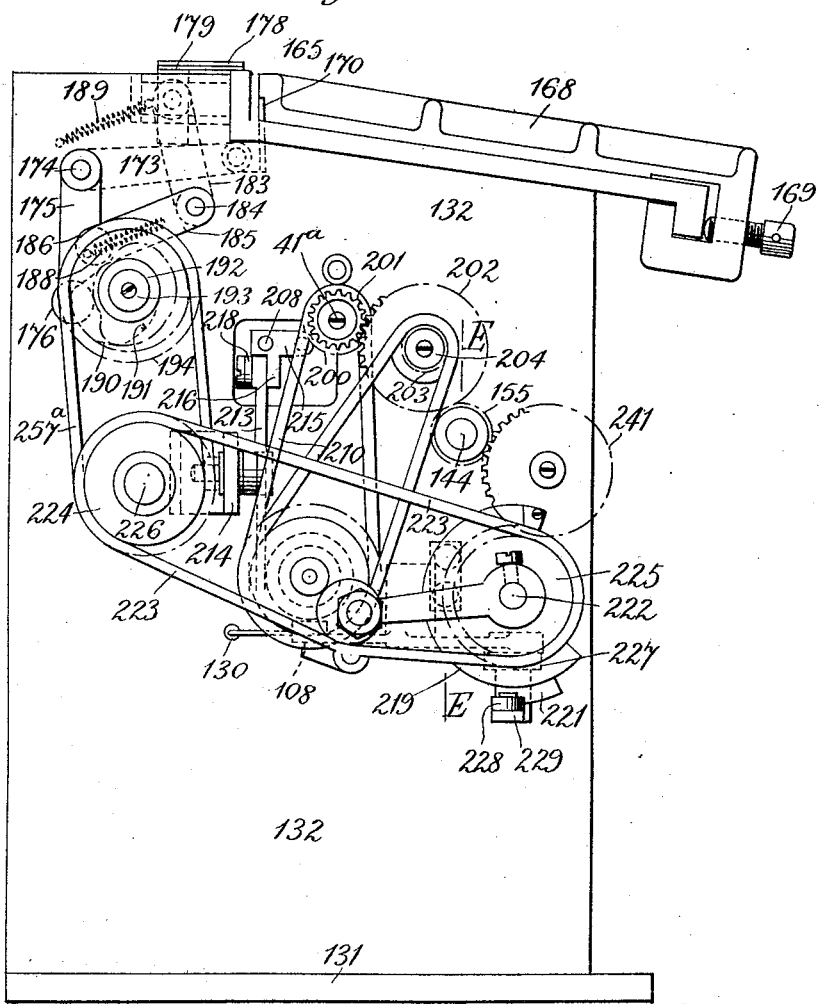

E. A. ADCOCK.
MACHINE OR APPARATUS FOR THE AUTOMATIC JUSTIFICATION OF LINES OF TYPE.
APPLICATION FILED NOV. 12, 1910.
1,008,936.
Patented Nov. 14, 1911.
15 SHEETS—SHEET 6.
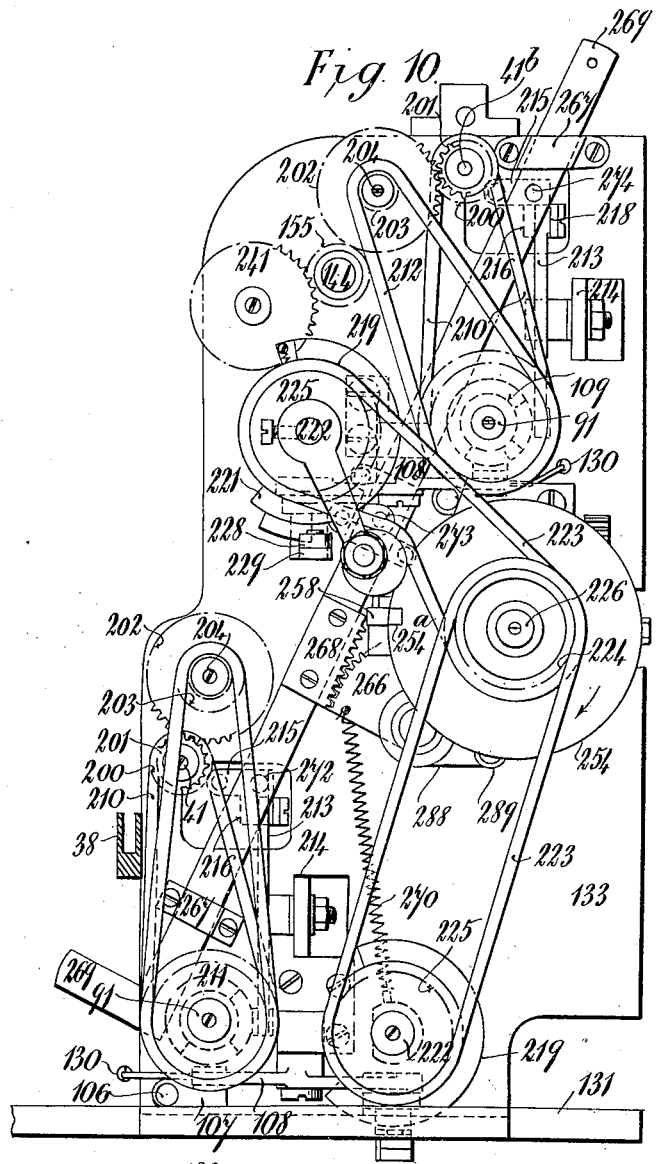
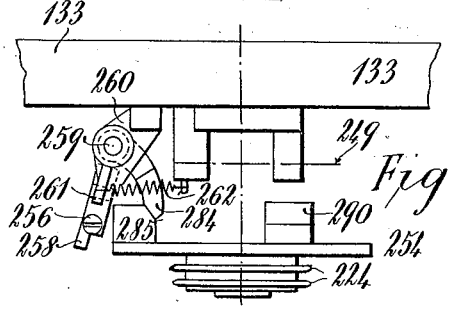

E. A. ADCOCK.
MACHINE OR APPARATUS FOR THE AUTOMATIC JUSTIFICATION OF LINES OF TYPE.
APPLICATION FILED NOV. 12, 1910.
1,008,936.
Patented Nov. 14, 1911.
15 SHEETS—SHEET 7.
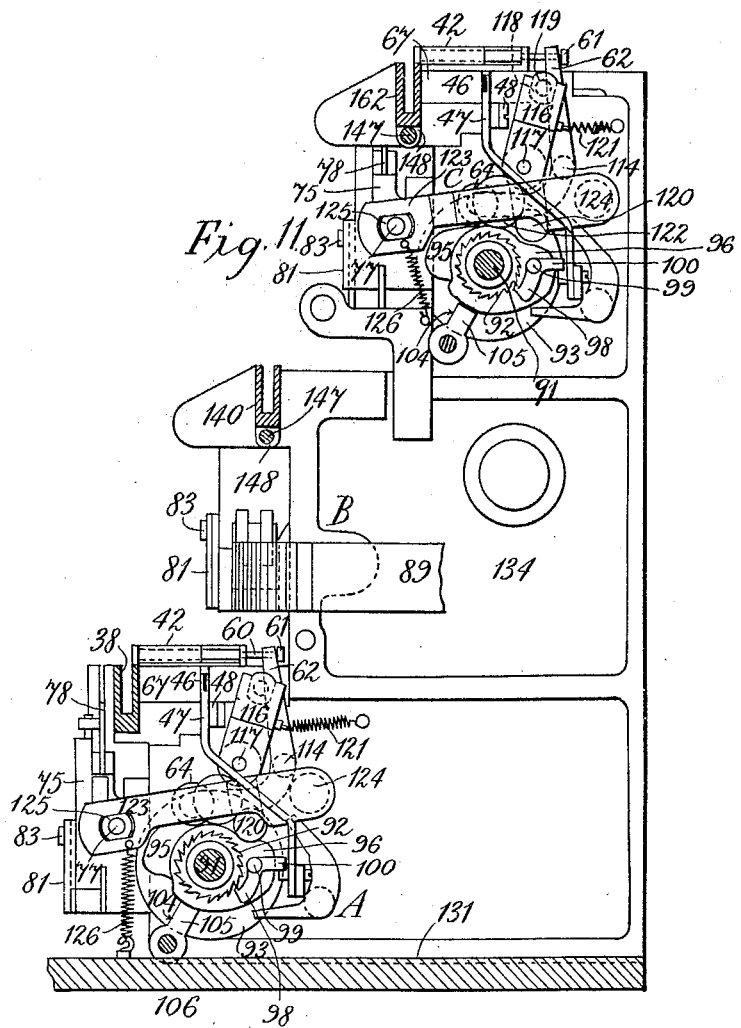
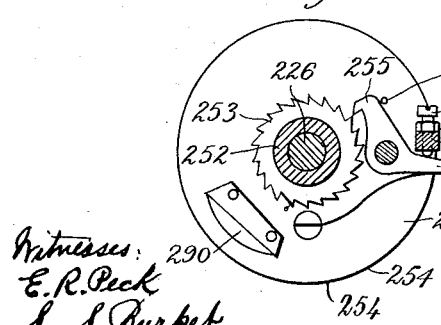
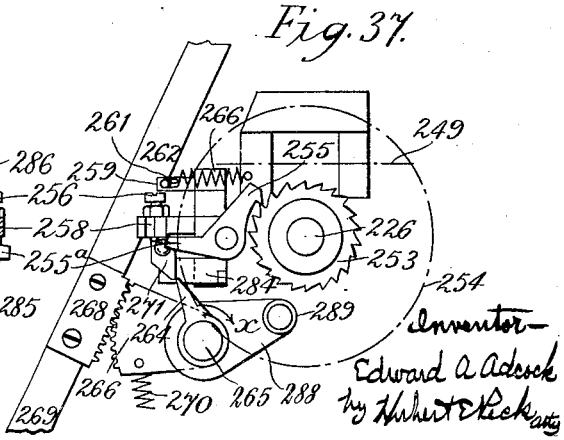

E. A. ADCOCK.
MACHINE OR APPARATUS FOR THE AUTOMATIC JUSTIFICATION OF LINES OF TYPE.
APPLICATION FILED NOV. 12, 1910.
1,008,936.
Patented Nov. 14, 1911.
15 SHEETS—SHEET 8.
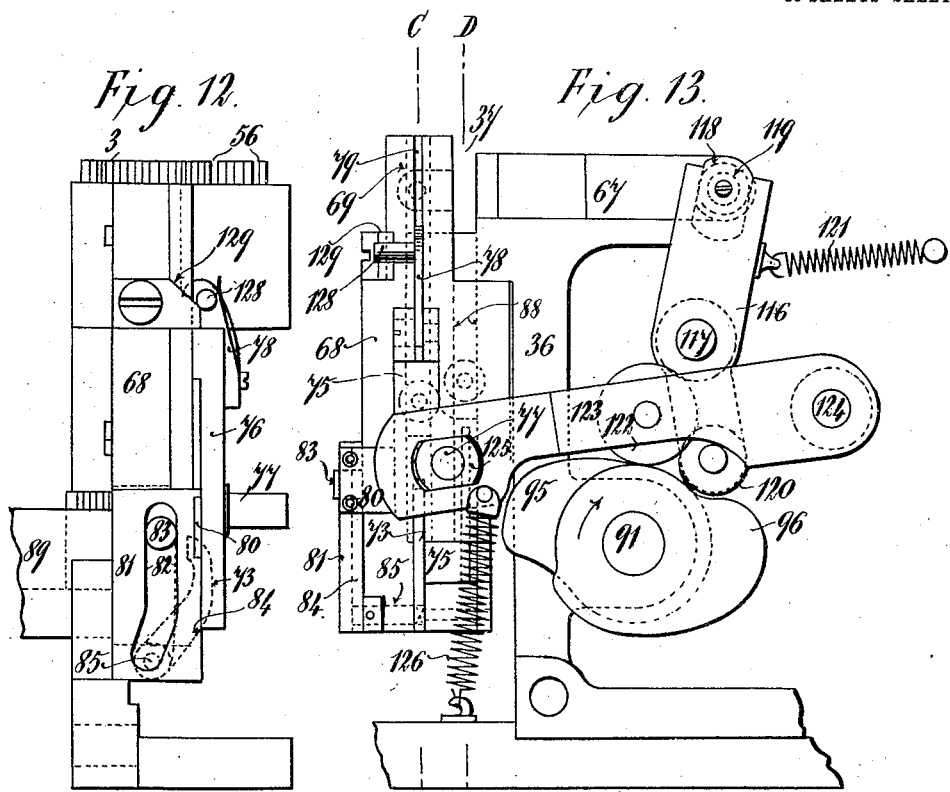
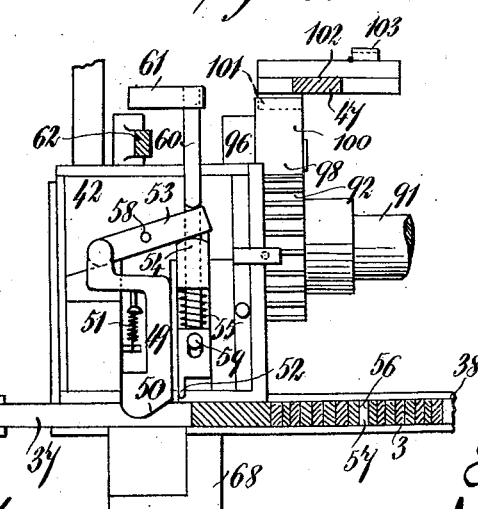
Witnesses:
E. R. Peck
L. L. Burket
Inventor:
Edward A. Adcock
by Hubert E. Peck
atty E. A. ADCOCK.
MACHINE OR APPARATUS FOR THE AUTOMATIC JUSTIFICATION OF LINES OF TYPE.
APPLICATION FILED NOV. 12, 1910.
1,008,936.
Patented Nov. 14, 1911.
15 SHEETS—SHEET 9.
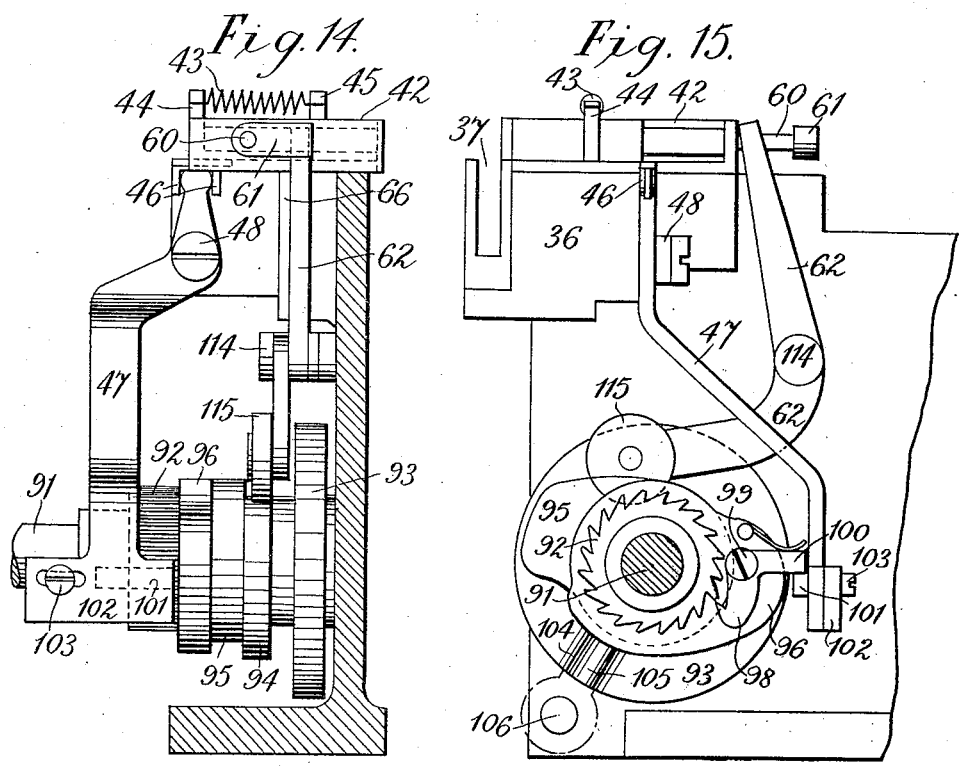
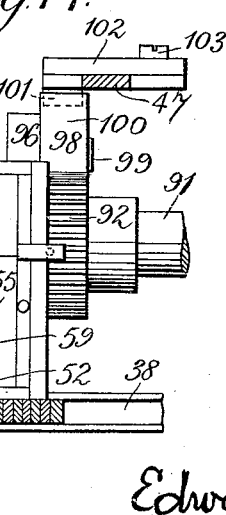
Witnesses:
E. R. Peck
L. L. Burket
Inventor:
Edward A. Adcock
by Hubert Peck
atty
COLUMBIA PLANOGRAPH CO., WASHINGTON, D. C.

E. A. ADCOCK.
MACHINE OR APPARATUS FOR THE AUTOMATIC JUSTIFICATION OF LINES OF TYPE.
APPLICATION FILED NOV. 12, 1910.
1,008,936.
Patented Nov. 14, 1911.
15 SHEETS—SHEET 10.
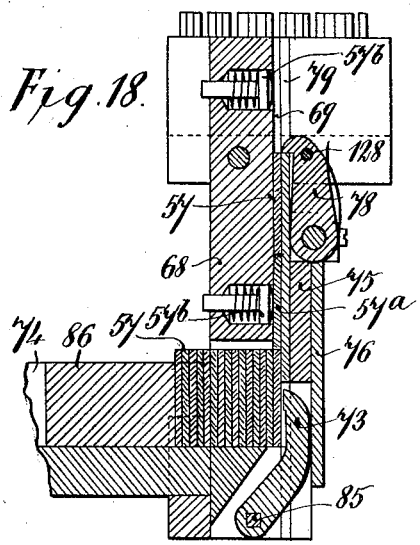
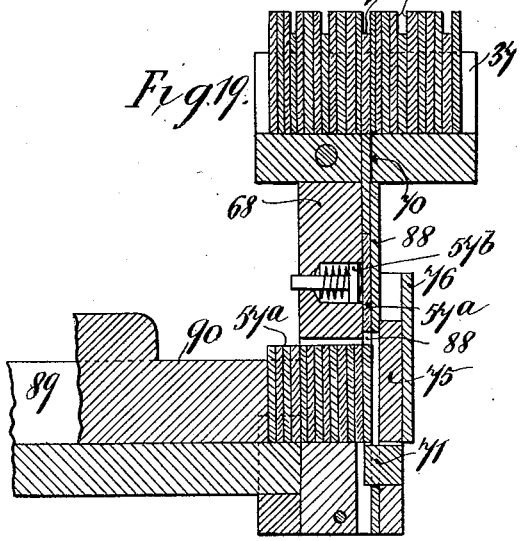
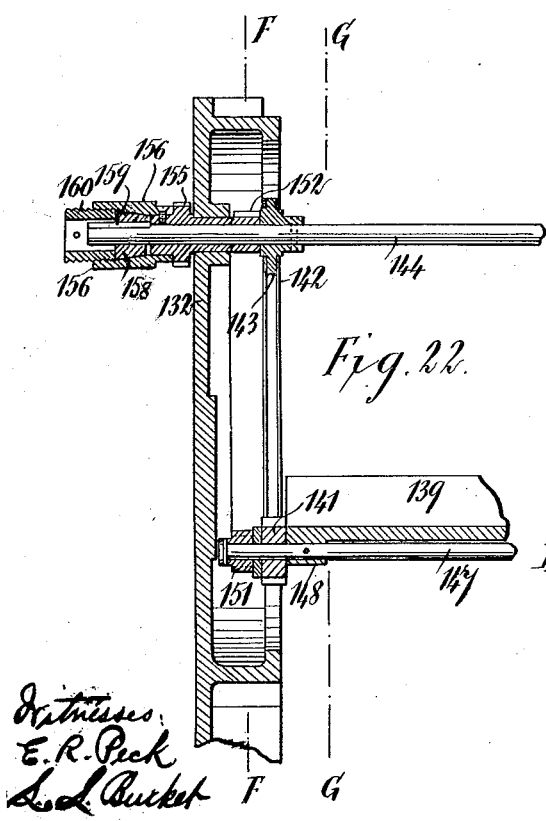
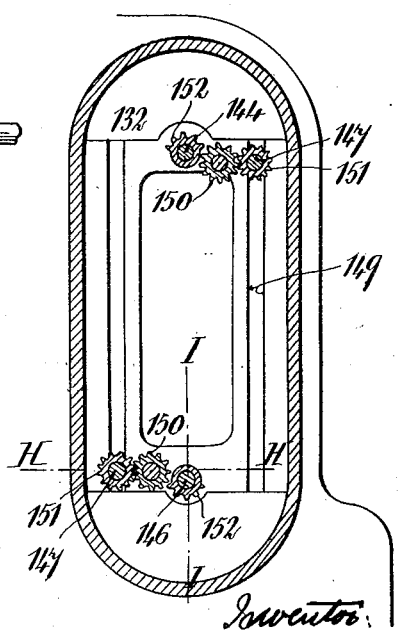

E. A. ADCOCK.
MACHINE OR APPARATUS FOR THE AUTOMATIC JUSTIFICATION OF LINES OF TYPE.
APPLICATION FILED NOV. 12, 1910.
1,008,936.
Patented Nov. 14, 1911.
15 SHEETS—SHEET 11.
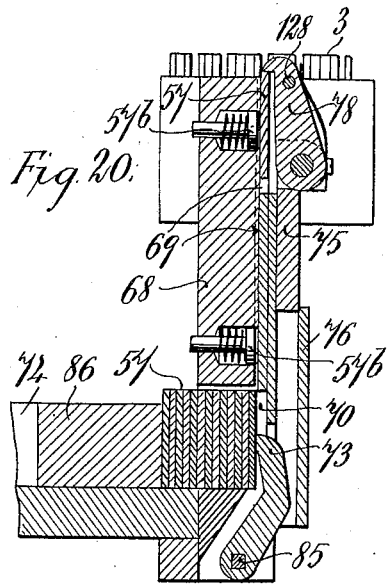
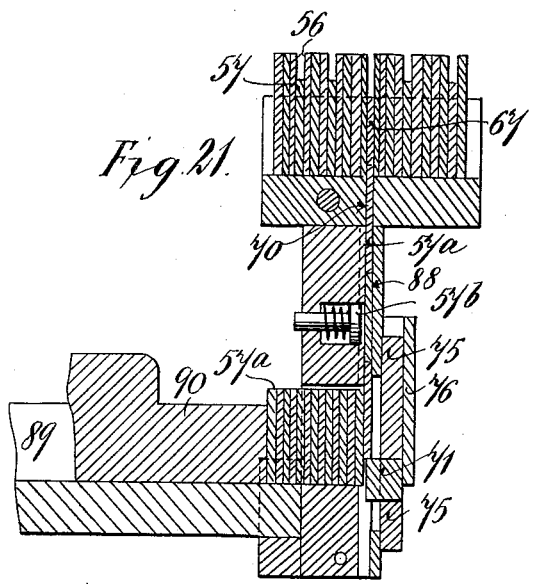
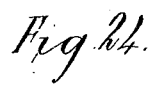
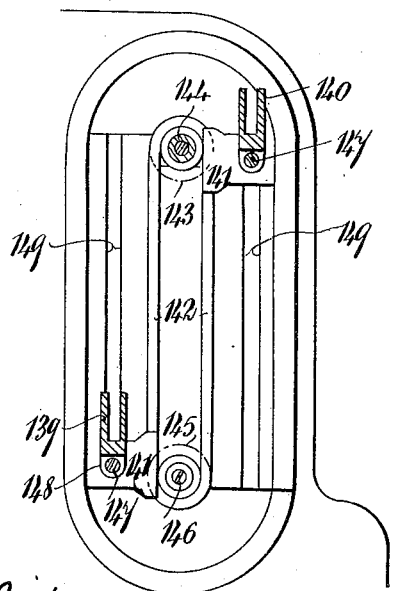
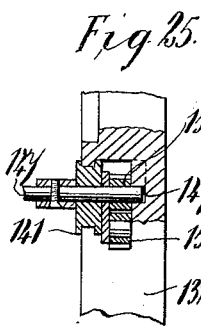
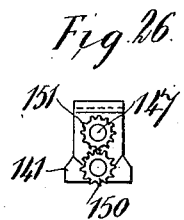
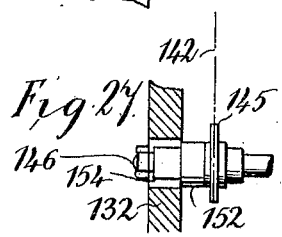
Witnesses:
E. R. Peck
L. L. Burket
Inventor:
Edward A. Adcock
by Hubert E. Beck
Atty
COLUMBIA PLANOGRAPH CO., WASHINGTON, D. C.

E. A. ADCOCK.
MACHINE OR APPARATUS FOR THE AUTOMATIC JUSTIFICATION OF LINES OF TYPE.
APPLICATION FILED NOV. 12, 1910.

1,008,936.

Patented Nov. 14, 1911.

Witnesses:
E. R. Pick
L. S. Burket

Inventor:
Edward A. Adcock
by Hubert Pick
atty.

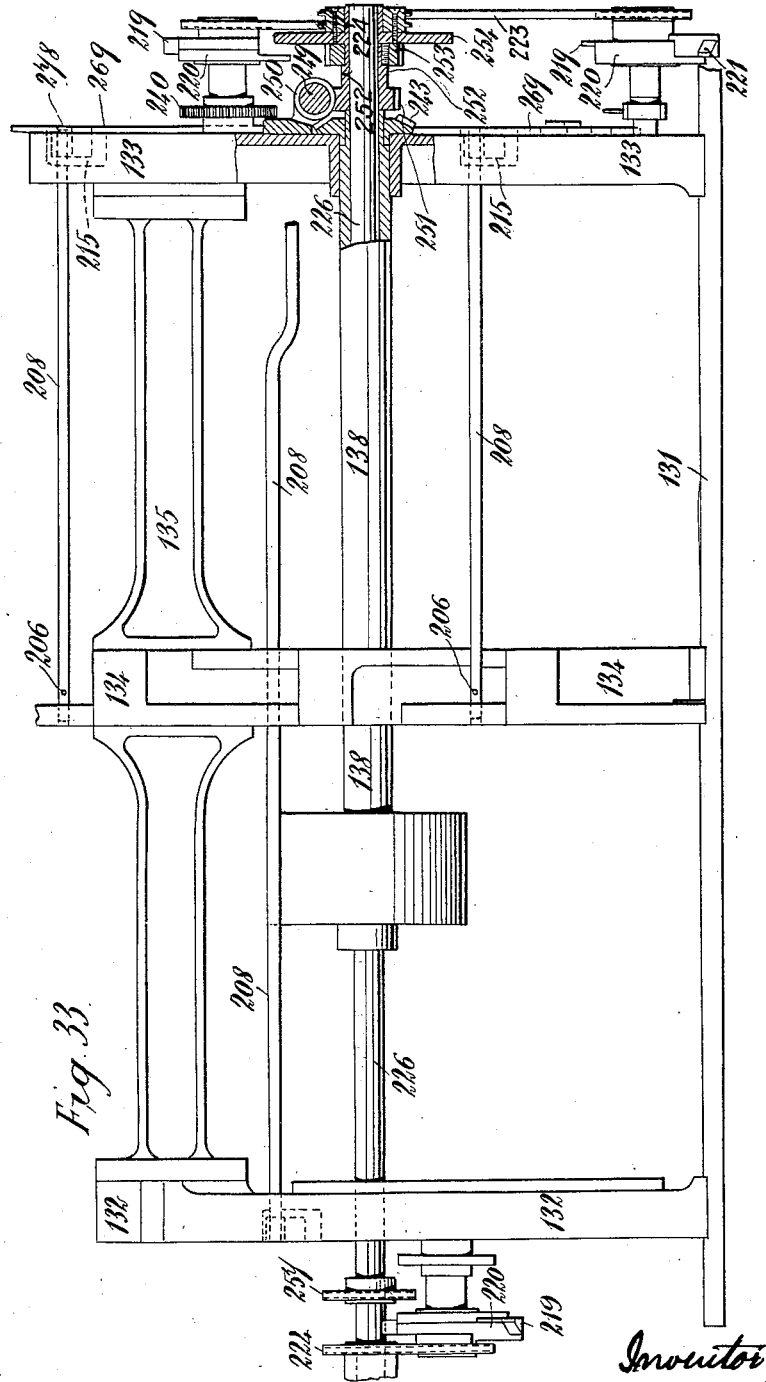

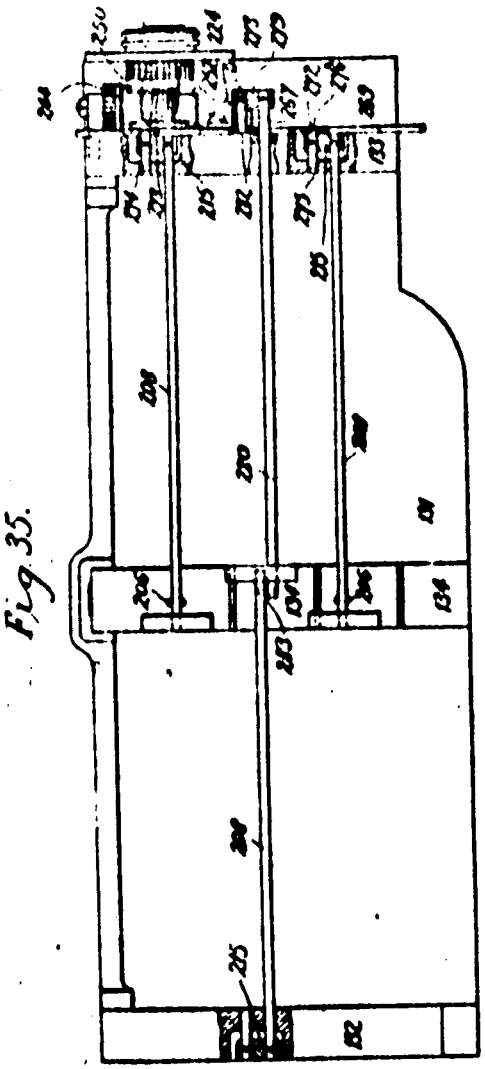

UNITED STATES PATENT OFFICE.

EDWARD AUGUSTUS ADCOCK, OF READING, ENGLAND, ASSIGNOR TO HIMSELF AND THE PULSOMETER ENGINEERING COMPANY LIMITED, OF READING, ENGLAND.

MACHINE OR APPARATUS FOR THE AUTOMATIC JUSTIFICATION OF LINES OF TYPE.

1,008,936.         Specification of Letters Patent.     Patented Nov. 14, 1911.

Application filed November 12, 1910. Serial No. 592,039.

*To all whom it may concern:*

Be it known that I, EDWARD AUGUSTUS ADCOCK, a subject of the King of Great Britain and Ireland, residing at Reading, in the county of Berks, England, have invented Improvements in Machines or Apparatus for the Automatic Justification of Lines of Type, of which the following is a specification.

This invention relates to the automatic removal of spaces of one thickness from, and the insertion of spaces of greater thickness in, an underset line of type until such line is expanded to the required justified length.

The primary object of the invention is to provide an improved machine or apparatus in which the ordinary spaces of commerce can be utilized in lieu of sets of differently nicked spaces as hitherto proposed.

Another object of the invention is to enable space ejecting mechanisms to be set in operation with the aid of a number of identical gap finders whereby the construction of the machine or apparatus is simplified.

A further object of the invention is to provide an improved form of expansible holder for the line of type which with a special arrangement of feed mechanism enables the time occupied in dealing with lines of type of different lengths to be varied directly with such length, other things being equal.

With these and other objects in view the invention consists in the various details and combinations of parts hereinafter described and illustrated.

Figure 31:
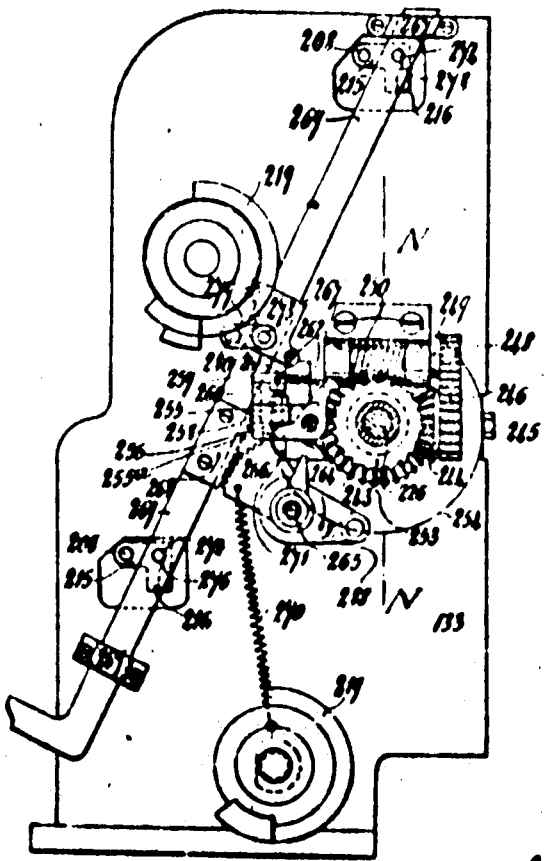

In the accompanying illustrative drawings, Figure 1 is a front elevation, Fig. 2 a rear elevation, Fig. 3 a plan, Fig. 4 a horizontal section on the line A A of Fig. 2, and Figs. 5 and 6 end views respectively of Figs. 2 and 1 showing one construction of an expansible type holder suitable for use in a type justifying machine, according to the invention, Figs. 1, 2, 5 and 6 also showing a guideway in which the said carrier works. Fig. 7 is a front elevation, Fig. 8 a plan and Figs. 9 and 10 left and right hand end views showing one construction of complete type justifying machine. Fig. 11 is a cross section corresponding to the line B B of Fig. 7 showing more particularly two sets of space changing mechanism. Figs. 12, 13 and 14 are respectively front, end and rear views showing, to a larger scale than Figs. 7 to 11, the construction of space changing mechanism. Fig. 15 is a similar view to Fig. 13 but showing some parts of the mechanism not shown in that figure. Figs. 16 and 17 are plan views of part of the space changing mechanism with the cover removed and with some of the parts in the two figures in different positions. Figs. 18 and 19 are longitudinal sections on the line C C and D D respectively of Fig. 13. Figs. 20 and 21 are similar views to Figs. 18 and 19 respectively but showing some of the parts in different positions. Fig. 22 is a part vertical section on the line E E of Fig. 9; Figs. 23 and 24 are cross sections on the line F F and G G respectively of Fig. 22, and Fig. 25 is a sectional plan on the line H H of Fig. 23. Fig. 26 is an end view of a trough carrier with toothed wheels at the end thereof. Fig. 27 is a cross section on the line I I of Fig. 23. Fig. 28 is a part cross section corresponding to the line K K of Fig. 8. Fig. 29 is a sectional plan showing a reversing clutch and cam mechanism corresponding to the upper feed screw and upper trough changing mechanism in Fig. 7. Figs. 30 and 31 are face views of the cam shown in Fig. 29 with the parts in different relative positions in the two figures and Fig. 32 is a section on the line M M of Fig. 30. Fig. 33 is a vertical section on the line N N of Fig. 34, Fig. 34 is an end elevation partly in section and Fig. 35 is a plan partly in section taken in different planes, showing a main clutch and other mechanism, Fig. 36 shows a part of the main clutch as seen from the inner side thereof. Fig. 37 is a similar view to Fig. 34, and Fig. 38 is a plan, showing some of the parts in different positions to those shown in Fig. 34. In most of the figures parts of the mechanism are removed to show other parts more clearly.

The type holder shown in Figs. 1 to 6 inclusive comprises a pair of jaws 1 and 2 adapted to hold a line of type 3 between them and one of which, viz 1, is fixed to the body of the holder while the other, viz 2, is capable of being moved endwise relatively to the first, against the action of a spring, by the expansion of the line of type held between them.

The body of the holder comprises two frame-like parts 4 and 5 of which 4 is adapted to slide in 5 so that the length of the holder can be adjusted to suit any desired length of line of type to be justified, the two parts being fixed together by a screw 6 carried by the part 5 and entering one or other of a series of holes 7 in the part 4, the part 5 having a leg 8, which, like the jaws 1 and 2 and the line of type 3 between them, is adapted to slide in a guide 9. The jaw 2 is carried by a bifurcated plate 10 which is arranged to slide longitudinally on the part 5 and is fixed by screws 11 to a rod 12. This rod works endwise in bearings 13 and 14 on the part 5 and is fixed by a screw 11ª to a bifurcated plate 15 arranged to slide on the part 4. Surrounding the rod 12 between the bearing 14 and the plate 15 is a coiled spring 16 that normally acts to hold the jaw plate 10 against the bearing 14, the distance between the jaws 1 and 2 corresponding to that of a line of type of less length than the required justified length. Mounted upon the holder is a device (hereinafter called for brevity and distinction a cut out device), comprising two frames 17 and 18 automatically adjustable in length with the holder. The frame 17 is mounted at its ends 17ª, 17ᵇ to turn upon a rod 19 mounted in bosses 20 and 21 on the parts 4 and 5 respectively of the holder, the said rod being fixed to the boss 20 by a pin 22, and the frame being prevented from moving endwise on the rod by a screw 23. The frame 18 is mounted at one end 18ª to turn on the rod 19 and at its other end 18ᵇ to turn upon the plain end 24ª of a screw 24 which is screwed into a split boss 5ª on the part 5 of the holder. Endwise movement of the frame 18 relative to the part 5 of the holder is prevented by a pin 25 fixed in the end 18ᵇ thereof and extending across a groove 26 in the end 24ª of the screw 24. The arrangement is such that the frames 17, 18 slide one over the other with adjustment of the holder, while by turning the screw 24, the frame 18 can be independently adjusted endwise if desired, the screw being afterward fixed in the split boss 5ª by a set screw 27. The plate 10 carries a stop or projection 28 which, until the line of type is justified, prevents movement of the frames 17 and 18 from the full line position into the dotted line position Fig. 6. 29 is a coiled spring fixed at one end to a pin 30 on the part 4 of the holder and at the other end to a pin 31 on the frame 17, which is thereby pressed against the frame 18 which is consequently pressed against the projection 28, the two frames 17 and 18 then occupying the inclined position shown in full lines in Figs. 5 and 6. The frame 18 is fitted with a steel wearing piece 18ᶜ so that when the projection 28 is brought by gradual endwise movement of the plate 10, during the justification of the line of type 3, to beyond the outside end edge of the wearing piece 18ᶜ, (Fig. 3) the combined frames 17 and 18 will, under the action of the spring 29, be caused to assume the reverse inclined position shown in dotted lines in Fig. 6 and thereby prevent the operation of the space changing mechanism during the travel, or further travel, of the line of type through the space changing mechanism, as will be hereinafter described.

32 is a thin steel strip fixed to the bottom of the bifurcated part 5 of the holder to prevent any of the type 3 being pushed into the space in the said part not occupied by the part 4 of the holder the bottom of which may be faced with a steel strip 33. 2ª is an extension of the leg 2 arranged to slide in a recess 8ª in the leg 8 and serve as an abutment to prevent a slide, hereinafter described, passing between the legs 2 and 8. This type holder it is to be understood is manually applied to and removed from the machine.

The space changing mechanism comprises, as shown in Figs. 12 to 21 inclusive, a stationary support 36 formed with a guideway 37 (Figs. 15, 16 and 17) through which the line of type 3 can be moved endwise from an adjacent trough 38 by the type holder hereinbefore described, under the action for example of a pusher 39 on a nut 40 (Fig. 7) traversed by a rotary feed screw 41. Upon the support 36 is mounted a slide 42 in the form of a box and hereinafter called for distinction the main slide, which is arranged to be moved in a longitudinal direction, to a limited extent, upon the support 36 against the action of a spring 43 connected to pins 44 and 45 on the support 36 and main slide 42 respectively and to thereby operate, as through a fork 46 (Figs. 14 and 15), means, such as a lever 47 pivoted at 48, for bringing into action a clutch device for setting in operation cam mechanism as and for a purpose hereinafter described. Within the main slide 42 is a transversely movable slide 49, having an inclined surface 50, arranged to normally extend across the path of a line of type 3 traveling through the guideway 37 (Fig. 16) and to be moved backward, against the action of a spring 51, by the front end of a traveling type holder with line of type 3 abutting against it and to be held thereby in the backward position (Fig. 17) while the line of type is passing it.

Within the main slide 42 is also mounted a transversely arranged movable tongue piece 52 (hereinafter called a gap finder) that is arranged to be pressed outward toward the line of type 3, as for example through a lever 53, plunger 54 and spring 55, when the transverse slide 49 is pressed backward by the line of type, and to shoot forward into the gap 56 (Figs. 1, 16 and 17) formed above the first space 57 in the line of type and between adjacent type, when such gap comes opposite to it and it is desired to replace the said space by another of greater thickness. The lever 53 is pivoted at 58 and is engaged with the slide 49 and plunger 54 as shown. The gap finder 52 is provided with an extension 59 which projects upward through the top of the main slide 42 and whereby the said gap finder can be moved into and held in the inoperative position by the cut out device 17 and 18 on the type holder (Figs. 1 to 6) when the line of type therein is justified and the said cut out device is thereby allowed to move into the dotted position shown in Fig. 6. The gap finder 52 is also provided with a horizontal rod 60 carrying a lateral arm 61 by which also it can be moved backward, as by a lever arm 62 and a cam, as hereinafter described, at the end of each space changing operation to allow of the line of type 3 proceeding. The rod 60 is recessed at opposite sides to receive the adjacent forked end of the lever 53 which acts upon the plunger 54 through which the rod 60 can slide. The lever 53 also acts upon the rod 60 to draw the gap finder 52 out of the pathway of the line of type, by the action of the forward movement of the transverse slide 49, when the line of type has passed. At one side of the guideway 37 is an aperture 66 (Fig. 14) through which works a horizontal space ejector 67 (Figs. 13 and 21) which is made of a thickness equal to that of the thickest space to be inserted. At the opposite side of the guideway 37 may be arranged in a block 68 fixed to the support 36 a vertical space channel 69 (Figs. 13, 18 and 20) into which the ejected space 57 is moved. In the bottom of the guideway 37, in the same plane as the said aperture 66 and space channel 69, is an aperture 70 (Figs. 19 and 21) through which a thicker space 57ª can be forced from below by a space lifter 71 to replace the space 57 that is being ejected. Opposite the lower end portion of the vertical space channel 69, at one side thereof, is a second space ejector 73 (Figs. 18 and 20) and at the opposite side of the said channel is a space trough 74 into which the lowermost space is pushed by the space ejector 73. The space lifter 71 is in the form of a small steel pusher carried by a vertically movable carrier 75 mounted to slide in a cover 76 on the block 68. The carrier 75 is provided with a pin 77 (Figs. 12 and 13) arranged to work in a vertical slot in the cover 76. Pivoted to the upper end of the carrier 75 is a spring catch 78 adapted, when lifted, to enter a slot 79 in one side of the vertical space channel 69 and to extend above the top of the space 57 last ejected from the line of type (Fig. 20), and on its next downward movement to move such space downward and then become disengaged therefrom (Fig. 18) so as to leave room for the next space 57 to be ejected from the line of type 3. Connected to the vertically movable carrier 75 through a transverse plate 80 is a vertical plate 81 (Figs. 12 and 13) formed with an upwardly extending cam slot 82. Into this slot extends a pin 83 carried by a lever arm 84 fixed to a spindle 85 to which the space ejector 73 is fixed. The slot 82 is so shaped, as shown, at its lower end that when the carrier 75 nearly reaches the end of its upward movement, it will cause the space ejector 73, through the pin 83, lever arm 84 and spindle 85, to push the lowermost space 57 from the vertical space channel 69 into the adjacent trough 74 against the resistance of a metal block or follower 86 therein (Figs. 18 and 20), and at the commencement of the next downward movement will return the space ejector 73 to its inoperative position (Fig. 18) preparatory to the spring catch 78 again coming into action to cause the descent of the spaces 57 in the vertical channel 69. Vertically below the aperture 70 in the floor of the guideway 37 in the support 36 is a vertical space channel 88 through which the thicker spaces 57ª are lifted by the space lifter 71 from a trough 89 along which the thicker spaces are pushed by a weighted block or follower 90 (Figs. 19 and 21).

57ᵇ are spring presses to keep the spaces 57 and 57ª in position in the channels.

Extending through the support 36 is a continuously running driving spindle 91 to which is fixed a ratchet toothed wheel 92, and on which is freely mounted a set of cams 93, 94, 95, and 96. Adjacent to the toothed wheel 92 and the set of cams is the clutch device hereinbefore referred to, that is under the control of the main slide 42. The clutch device comprises a spring pawl 98 pivoted at 99 to the cam 96 and formed with a tail piece 100 that is normally held by a catch or stop 101 on the lower end of the lever 47 the other end of which is engaged by the fork 46. The stop 101 may be directly carried by a plate 102 that can be adjusted on the lever 47 and fixed by a screw 103. The arrangement is such that when the main slide 42 is in its normal position, the catch 101 on the lever 47 is in a position to hold the pawl 98 clear of the toothed wheel 92 and disconnect the set of cams 93, 94, 95 and 96 from the spindle 91, and when the main slide 42 is moved forward to a limited extent by the line of type 3 acting through the gap finder 52 that has entered a gap above a space 57 in the line of type 3, the lever catch 101 will be withdrawn from the pawl 98 and the latter allowed to move under the action of its spring, into engagement with the toothed wheel 92 and connect the cams to the driving spindle 91. The cam 93 is so formed that immediately upon the set of cams being set in operation, it will act to stop the motion of the type holder (Figs. 1 to 6). For this purpose it may for example be formed with a recess 104 (Fig. 15) in which normally rests a lateral arm 105 (Fig. 11) fixed to one end of an endwise movable rod 106 (Fig. 7) the other end of which is provided with an arm 107 that is adapted when the rod 106 is moved to the right by the action of the cam 93 on the arm 105, to engage laterally against and move a clutch lever 108 (Fig. 7). This movement of the clutch lever 108 moves the endwise movable driving member 109 out of engagement with the member 110 of a reversing clutch 109, 110 and 111 mounted upon the driving spindle 91 and thereby disconnects the feed screw 41 from the driving spindle 91 and brings the type holder (Figs. 1 to 6) and the line of type therein to rest with the first space 57 in the line of type in the plane of the space ejector 67, the space lifter 71 and the vertical type channels 69 and 88. The arm 105 is kept pressed against the face of the cam 93, by a spring 112 acting against a collar 113 on the rod 106 (Fig. 7). The cam 94 is adapted to operate the bell crank lever 62 (Fig. 15) which is pivoted at 114 and provided with an antifriction roller 115. The cam 95 is arranged to operate a bell crank lever 116 (Fig. 13) which is pivoted at 117 and has its upper end forked and engaging a block 118 journaled on a pin 119 fixed to the space ejector 67, the cam acting on the lever through an antifriction roller 120 against the action of a spring 121. The cam 96 acts through an antifriction roller 122 against a lever 123 pivoted at 124 and engaging a block 125 journaled on the pin 77 fixed to the vertical movable carrier 75.

The operation of the space changing mechanism is as follows:—Assuming a line of type 3 held by the type holder to be of less than the required length and to be placed in a trough 38 (Figs. 16 and 17) in line with the guideway 37 in the stationary carrier 36, then upon setting the feed screw 41 in operation, through gearing as hereinafter described, by engaging the clutch member 109 with the member 110 the type holder and line of type will be fed forward through the trough and into the guideway. Here the forward end of the line of type 3 will abut against and force back the transverse slide 49 and force the gap finder 52 outward against the moving line of type until the gap 56 above the first space 57 in the line comes opposite to it, the extension 2ª of the leg 2 preventing the slide 49 passing between the legs 2 and 8 at any time. The gap finder will then spring forward into the gap and it and the main slide 42 will be moved forward by the moving line of type so as to cause the fork 46 (Figs. 14 and 15) to operate the lever 47 to withdraw the catch 101 and release the clutch pawl 98 and enable the latter to connect the set of cams 93 to 96 to the corresponding driving spindle 91. The cam 93 will then operate the clutch member 109 to disconnect the feed screw 41 from its driving shaft, as hereinbefore described, and arrest the line of type 3 with the said first space 57 in the plane of the space ejector 67, the space lifter 71 and the vertical space channels 69 and 70, as hereinbefore described. The cam 95 will then actuate the lever 116 and space ejector 67 to force the space 57 from the line into the vertical space channel 69 the space ejector then remaining at rest for a short time owing to the passage of a concentric part of the cam 95 past the roller 120.

While the space ejector is at rest the cam 96 will actuate the lever 123 and carrier 75 with space lifter 71 to raise a thicker space 57ª from the trough 89 below and cause it to enter the lower end of the gap left by the ejected space 57 (see Fig. 21) and then come to, and remain at rest owing to a concentric part of the cam 96 then moving past the roller 122 on the lever 123, until after the lever 116 has been released by the cam 95 and the space ejector 67 has been returned to its original position by the spring 121 (Fig. 13). The cam 96 will then cause the lever 123 with carrier 75 and space lifter 71 to resume its rising motion to fully insert the thicker space 57ª in the line of type 3 and to raise the spring catch 78 and operate the space ejector 73 through the cam 82 in the plate 81, pin 83, arm 84 and spindle 85 (Figs. 12 and 13). After this the carrier 75 with space lifter 71 will descend under the action of a spring 126, thereby causing the space ejector 73 to return to its normal position, and the spring catch 78 to force the ejected space 57 down the space channel 69 (Fig. 18), the spring catch being finally withdrawn from this channel by reason of a lateral pin 128 thereon acting against a stationary inclined plane 129 fixed to the block 68. During or upon the completion of the last mentioned movement of the carrier 75 with attached parts, the cam 94 will come into operation to actuate the lever 62 and withdraw the gap finder 52 from the line of type and enable the main slide 42 to immediately return to its initial position under the action of its spring 43 and move the catch lever 47 back into a position to cause the catch 101 thereon to disengage the pawl 98 from the toothed driving wheel 92 and thereby put the cam mechanism out of operation after the same has made one complete revolution. Just before the opening of the pawl clutch the cam 93 comes into a position to permit the arm 105 on the rod 106 to reënter the recess 104 in the cam face and enable the said rod to be moved back by its spring 112 so as to release the clutch lever 108 and allow it, under the action of a spring 130, to move the clutch member 109 into driving contact with the clutch member 110 to again connect the feed screw 41 to its driving shaft 91 and cause the line of type 3 to again travel forward. The cam 94 acts to release the lever 62 and the gap finder 52 after the box 42 has been allowed to return to its initial position and before the completion of the revolution of the cam. If the line of type is not yet justified, upon the next space gap therein coming opposite the gap finder, the latter will spring into it and the above described operations will be repeated. In this way the line of type will be gradually lengthened and the movable jaw 2 of the type holder (Figs. 1 to 6) pressed back. Upon the insertion of the space that finally justifies the line of type, the said movable jaw 2 will be moved so far as to cause the stop 28 to release the cut out device 17—18 and permit this device to assume the dotted position shown in Fig. 6 in which it will act against and move back the upward extension 59 of the gap finder 52 (Figs. 16 and 17) and hold back the gap finder so as to permit the remainder of the line of type 3 to be continuously fed through the space changing mechanism without the same being further operated, after which the transverse slide 49 will resume its initial position across the guideway 37 ready to be again operated by another line of type.

It has been found in practice that when using four spaces that is to say an original and three substitute sets differing in thickness by the amount hereinbefore mentioned, three sets of space changing mechanism such as described are sufficient for the justification of practically all lines of type to be dealt with. These sets of mechanism can be arranged in various ways and a line of type passed through each of them in succession, the intention being to commence justification with spaces that are but little thicker than the original spaces, and to continue the justification, if necessary, by replacing the substitute spaces with others of still greater thickness and so on. It is however found advantageous to move the line of type to be justified through the guideway of the first space changing mechanism in one direction from a fixed trough into a movable trough, to then move the latter trough with the line of type into line with the guideway in the second space changing mechanism and then to move the line of type through such guideway in the opposite direction into a second movable trough which, with the line of type, is then moved into line with the guideway in the third space changing mechanism through which the line of type is moved in the first direction into a fixed type galley, the whole of these operations being effected automatically. The arrangement of the various parts and the construction of the trough changing mechanism and operating means to enable a line of type to be thus dealt with can be variously modified.

In the drawings, the frame of the machine comprises a base plate 131 (Figs. 7 to 11) with two transversely arranged end plates 132 and 133 and an intermediate plate 134, the several plates being securely connected together as by a longitudinal member 135. Upon the intermediate plate 134 are mounted, at different levels, three sets of space changing mechanism at A, B and C constructed and operating as hereinbefore described, the lowest set at A being arranged in advance of the intermediate set at B which is arranged in advance of the upper set at C (Fig. 11). Mounted in bearings in the plates are the three driving spindles 91 with toothed wheels 92 for operating the cam mechanism of the space changing mechanism as hereinbefore described, these spindles being driven by chains 136, from a main driving shaft 138 which is mounted in bearings in the plates 133 and 134. In line with the guideway in the lower space changing mechanism at A and on the right hand side thereof, is a fixed longitudinally arranged troughway 38 (Fig. 7) into which types are continuously fed from a type setting machine of any suitable kind. Between the plates 132 and 134 are two longitudinally arranged type troughs 139 and 140 fixed to a pair of carriers 141 (Figs. 7 and 22 to 25) mounted on a pair of endless chains 142 that pass over sprocket wheels 143 fixed upon a driving spindle 144 (hereinafter called for distinction the trough changing spindle) journaled in the two plates 132 and 134, and also around a pair of sprocket wheels 145 mounted to turn upon a lower spindle or preferably upon a pair of co-axial pins 146 (Figs. 24 and 27) fixed to the said plates, the two troughs being spaced apart and so arranged on the chains, as shown, that one can be placed in line with the guideway 37 in the lower space changing mechanism at A and the other in line with the guideway 37 in the intermediate space changing mechanism at B. The two trough carriers 141 for each type trough 139 or 140 are jointed to the chains, and loosely mounted in them is a rod 147 to which the lugs 148 on the trough are fixed, one end of each rod 147 extending into a corresponding vertical guide slot 149 in the plate 132. Means are provided to keep each trough upright during its upward and downward movements with the chains 142 and when passing over and under the spindles 144 and 146. For these purposes each trough carrier 141 may have journaled to a pin thereon adjacent to the corresponding plate 132, a toothed wheel 150 (Figs. 23, 25 and 26) gearing into a toothed wheel 151, having a squared end engaging the guide slot 149, fixed to the corresponding end of the rod 147 to which the trough is fixed and gearing, when passing over the upper spindle 144 and under the lower pins 146 with a fixed toothed segment 152 coaxial with the said spindle 144 or pins 146. The toothed segment 152 for the trough changing spindle 144 is formed on a bush, fixed in the adjacent plate 132 and serving as a bearing for the corresponding end of the spindle 144. The two pins 146 may be each vertically adjustable in a slot 154 in its carrying plate 132 or 134 (see Fig. 27). One end of the trough changing spindle 144 projects through the end plate 132 and to it is fixed a driving pinion 155. To admit of the chains 142 being adjusted circumferentially relatively to the pinion 155 to bring the troughs 139 and 140 into line with the guideways 37 in the space changing mechanism at A and B, the pinion 155 may be mounted to turn on the spindle and be fixed thereto through a sleeve 156 having a conical interior, against which, after adjustment of the chains and troughs, an endwise movable cone 158 that is connected to the spindle by a feather 159 can be forced by a nut 160 screwed into the sleeve 156. The arrangement of the trough changing mechanism just described is such that each time the trough changing spindle 144 is rotated to a given extent, as hereinafter described, the trough 139 that is, for the time being, the lower one and is in line with the guideway 37 in the lower space changing mechanism at A, will be raised, passed over the trough changing spindle 144 and brought into line with the guideway 37 of the intermediate space changing mechanism at B while the trough 140 that was in line with the guideway in the intermediate space changing mechanism at B will be lowered, passed around the lower pins 146 and brought into line with the guideway in the lower space changing mechanism at A, the troughs being at all times maintained in their upright positions. Between the intermediate plate 134 and end plate 133 are arranged a similar pair of longitudinally arranged type troughs 161 and 162 with changing mechanism such as described (Fig. 7) whereby one trough can be held in line with the guideway 37 in the intermediate space changing mechanism at B and on the right hand side thereof, while the other is held in line with and on the right hand side of the guideway in the upper space changing mechanism at C and whereby these troughs can be caused to change places when the trough changing spindle 144 corresponding thereto is rotated to a predetermined extent. On the left hand side of the upper space changing mechanism at C is a type galley 164 (Figs. 7, 8, 9 and 28) carried by the end plate 132 and intermediate plate 134. This galley is formed with a type trough or guideway 165 into which each justified line of type with its type holder passes from the upper space changing mechanism at C and from which and the type holder, the justified line of type is forced sidewise into the galley by a pusher.

The type galley consists of an inclined plate of the section shown in Fig. 28, and having at one side a fixed guide wall 166 and at the other side a movable wall 168 that can be adjusted sidewise and fixed by a screw 169 to suit the justified length of the lines of type. The front side of the type trough 165 in the galley is formed by a plate 170 that is vertically movable in guides upon the end and central plates 132 and 134 and is provided with lugs 171. Through each of these lugs extends a pin 172 with which is engaged the slotted end of an arm 173 fixed upon a spindle 174 journaled in bearings in the plates 132 and 134 and provided on the end projecting through the plate 132 with an arm 175 carrying an antifriction roller 176. The pusher for pushing the line of type from the guideway 165 onto the galley 164 comprises two plates 178 and 179 of which the latter is capable of being adjusted endwise in relation to the other to suit the required length of the justified lines of type. Each of these plates is formed on its underside with a lug fixed to a longitudinal rod 180 carried by a pair of blocks 181 (Fig. 8) mounted to slide in transverse guides 182 on the opposing sides of the plates 132 and 134. The rod 180 is engaged near its ends by the slotted ends of two arms 183 fixed upon a rod 184 journaled in the plates 132 and 134 and the end of which projecting through the plate 132 is provided with an arm 185 carrying an antifriction roller 186. The two rollers 176 and 186 are pressed by springs 188 and 189 (Fig. 9) respectively against two cams 190 and 191 on a sleeve 192 which is mounted to rotate on a fixed pin 193 on the plate 132 and is provided with a sprocket wheel 194 arranged to be driven as hereinafter described. The arrangement is such that when the cam sleeve 192 is rotated, the rod 174 with arms 173 will be caused by the cam 190 to first depress the plate 170 after which the rod 184 with arms 183 will be operated by the cam 191 to move the pusher 178—179 forward to push the justified line of type 3 from the guideway 165 and type holder on to the galley 164 after which the several parts are returned to their original positions.

195 is a metal block to support the justified lines of type 3 on the galley.

Journaled in bearings carried by the intermediate plate 134 and one or other of the end plates 132 or 133 are three longitudinally arranged feed screws 41, 41ª and 41ᵇ (Figs. 7 and 8) of which the lowest one is arranged above and to the rear of the lower right hand fixed type trough 38, the intermediate one 41ª is arranged above and to the rear of the upper of the two left hand movable type troughs 139 and 140, and the upper one 41ᵇ is arranged above and to the rear of the upper of the two right hand movable type troughs 161 and 162. The screws 41 and 41ᵇ are left handed and the screw 41ª is right handed. The right hand ends of the lower and upper feed screws 41 and 41ᵇ extend through the plate 133 while the feed screw 41ª extends through plate 132. To the outer end of each feed screw is fixed a sprocket pinion 200 (Figs. 7 to 9) and also a spur pinion 201 which is in gear with a spur wheel 202 which is fixed to a sprocket pinion 203 and mounted to rotate on a projecting pin 204 fixed to the outer side of the adjacent end plate 132 or 133.

Engaging each feed screw is a nut 40 mounted to slide endwise on a rod 205 and carrying a plate or follower 39 arranged to push a type holder with a line of type in a forward direction through the adjacent trough and through the guideway in the adjacent space changing mechanism as hereinbefore described, the nut being arranged to finally abut against a clutch operating device such as a pin 206 (Figs. 8 and 35) fixed to a rod 208 that is arranged adjacent to the feed screw and is movable endwise in the plates 132 or 133 and the plate 134 for a purpose hereinafter described.

The driving spindles 91 for the lower and upper sets of space changing mechanism at A and C respectively are carried by the intermediate plate 134 and plate 133 and extend through the latter plate, and the driving spindle 91 for the intermediate space changing mechanism at B is carried by the intermediate plate 134 and plate 132 and extends through the latter plate. Upon the outer end of each of these driving spindles is, as hereinbefore described, a reversible clutch device comprising two oppositely arranged toothed wheels 110 and 111 having ratchet shaped teeth, and an intermediate clutch part 109 also having ratchet shaped teeth. The wheel 110 is mounted to turn freely on a boss on the outer side of the corresponding end plate 132 or 133, and the wheel 111 to turn freely on the outer end of the driving spindle 91. The clutch part 109 is mounted to slide on but is keyed to turn with the driving spindle 91 so that it can be moved endwise to engage either of the adjacent toothed wheels 110 or 111 and drive the same, or be moved into a mid or inoperative position. Fixed to each toothed wheel 110 is a sprocket wheel 209 around which passes an endless chain 210 which also passes around the sprocket wheel 200 on the projecting end of the corresponding feed screw. To the toothed wheel 111 is fixed another sprocket wheel 211 around which passes an endless chain 212 which also passes around the sprocket wheel 203 mounted to rotate on the said pin 204. The arrangement is such that when the clutch sleeve 109 is moved into engagement with the inner toothed wheel 110, the feed screw 41, 41ª or 41ᵇ, as the case may be, will be directly rotated in a direction to move its nut 40 with pusher 39 and a type holder with a line of type, in a forward direction; when it is moved to engage the outer toothed wheel 111, the feed screw will be indirectly rotated at a quicker rate in a backward direction to return the nut 40 with pusher 39 to its original position, and when it is moved into its mid position the feed screw will come to rest. The clutch sleeve 109 in addition to being moved into the mid or inoperative position by the cam 93 and arm 107 can be moved to stop the corresponding feed screw, by a roller on the lower end of a lever 213 that is mounted to turn about a horizontal axis in a bracket 214 fixed to the outer side of the corresponding end plate 132 or 133 and is connected to the corresponding clutch operating device, comprising the rod 208 and pin 206 (Figs. 7, 8 and 35), arranged to be operated by the nut 40 at the end of its forward travel, as hereinafter described. To the outer end of each rod 208 is fixed a block 215; to a lug 216 (Fig. 9) on which, the upper end of the clutch arm 213 is connected by a link 218, the arrangement being such that when the rod 208 is moved inward by the nut 40 abutting against the pin 206 thereon, the lever 213 will move the clutch sleeve 109 into its mid or inoperative position. The clutch sleeve 109 is arranged to be moved into engagement with the outer toothed wheel 111 of the reversing clutch, in order to rapidly rotate the feed screw in a reverse direction and return the nut 40 with pusher 39 to its initial position by the clutch lever 108 under the action of a cam 219 on a cam disk 220 which is provided with another cam 221 for afterward causing the said clutch lever 108 to move the clutch sleeve 109 into the mid position and hold it in that position before the cam disk completes one rotation. Each of the three cam disks 220 is carried by a sleeve mounted to turn on a pin 222 fixed to the outer side of the corresponding end plate 132 or 133 and is driven through an endless chain 223 and sprocket wheels 224 and 225 from a longitudinal driving shaft 226 (hereinafter called the secondary driving shaft) which is adapted to be put in and out of driving connection with the main driving shaft 138 through a main clutch device under the control of a starting device as hereinafter described. The cam 219 acts upon a roller 227 carried by one end of the clutch lever 108 to force the clutch part 109 into engagement with the clutch part 111 and the cam 221 acts against a roller 228 carried by an arm 229, secured to the said end of the lever, to move the clutch part 109 into the mid position.

To enable the time when the cam 221 shall act to return the clutch sleeve 109 to its mid position and stop the reverse motion of the feed screw and nut 40 to be varied to suit the length of lines of type to be justified, the cams 219 and 221 are formed as two separate parts that are relatively adjustable in a rotary direction (Figs. 30 and 31). The cam part 219, having an inclined surface 230 thereon, is rigidly fixed to the cam disk 220. The other cam part 221 is carried by a ring 232 mounted to turn on a boss on the cam disk 220 and is maintained laterally in place thereon by a washer 233 fixed to the face of the boss, the ring having short inclines at 234 and 235 thereon. Between the inclines 234 and 235 the periphery of the ring 232 is cut away as shown in Figs. 30 and 31 to a depth corresponding to half the face thickness of the ring. Pivoted on a pin 236 fixed to the disk 220 at the end of the segmental cam part 219 and opposite to the inclined surface 230 is a spring latch 238 the free end of which is adapted to enter one or other of a series of recesses 239 in the ring 232 and hold this ring with the cam part 221 in any desired position relatively to the cam part 219. In Fig. 30, the cam parts 219 and 221 are in the relative positions in which the roller 227 will be acted upon for the maximum time, and in Fig. 31 they are in the relative positions in which the said roller will be acted upon for the minimum time. This will be understood by noting that the roller 227, indicated by dot and dash lines, runs half on each of the parts 219 and 232 so that after the part 219 has passed the roller the latter bears against the face of the adjustable part 232. In Fig. 30 the roller is supported by the two parts until the cam has nearly made a complete revolution, corresponding to the longest line of type capable of being justified by the machine. In Fig. 31, after the part 219 has passed the roller, the latter is only supported for a short time by the part 232 before the inclined surface 235 allows it to enter the recess made by cutting away a portion of the periphery of the ring 232 between the inclined surfaces 230 and 235. The cam 221 acts against the roller 228 to positively move the clutch sleeve 109 into the mid position.

The sleeve of the cam disk 220 at the left hand side of the machine corresponding to the intermediate feed screw 41ª, and the sleeve of the cam disk 220 at the upper part of the right hand side of the machine, corresponding to the upper screw 41ᵇ, are each provided with a toothed wheel 240 (Figs. 7 to 10) gearing into a double width toothed wheel 241 gearing into the toothed driving wheel 155 (Fig. 22) fixed on the outer end of the corresponding trough changing spindle 144. The arrangement of this gearing is such that with one complete revolution of the cam disk, the trough changing spindle will be rotated to the extent necessary to raise that trough of the pair of troughs 139 and 140, or 161 and 162, that was in the lower position into the proper upper position and that trough that was in the upper position into the proper lower position.

The main clutch for putting the secondary driving shaft 226 in and out of driving connection with the main driving shaft 138, and the means used for closing and opening such clutch can be variously constructed. According to the arrangement shown, one end of the main driving shaft 138 extends through the plate 133 (Figs. 7 and 33) and is provided with a bevel wheel 243 in gear with another bevel wheel 244 (Fig. 34) which is mounted to rotate about a transverse pin 245 and is connected to a spur wheel 246. This spur wheel gears with another spur wheel 248 arranged above it and fixed upon a transverse spindle 249 carrying a worm 250 gearing into a worm wheel 251 on a sleeve 252 provided with a toothed wheel 253. This wheel is arranged adjacent to a driving disk 254 to the inner side of which is pivoted a spring pawl 255 that is held normally out of engagement with the toothed wheel 253 by a movable stop 256. The sleeve 252 is mounted to turn freely upon the outer end of the shaft 226 to which the disk 254 is fixed and which extends through the main driving shaft 138 and the plate 132. The shaft 226 also carries, at its left hand end, a sprocket wheel 257 for actuating through an endless chain 257ª and the sprocket 194, the pair of cams 190 and 191 for operating the vertically movable plate 170 and pusher 178—179 (Figs. 9 and 28). The stop 256 comprises an adjustable set screw carried by one end of a lever 258 which is fixed at its other end to a pin 259 (Fig. 38) journaled in a bracket 260 fixed to the outer side of the plate 133. The head of the pin, above the said bracket, carries a collar with pin 261 to which is connected a spring 262 that tends to force the end of the lever into a notch 254ª in the periphery of the disk 254, in which position the stop 256 will hold the pawl 255 clear of the toothed wheel 253. To a lug on the underside of the lever 258 is pivoted a depending catch 271 (Fig. 34) that can turn about its pivot in a counter-clockwise direction from its normal position but cannot turn in the opposite direction. Mounted upon the outer side of the plate 133 is a clutch controlling device which comprises a lever 264. This lever, when turned to the left (Figs. 9 and 34) will act against the catch 271 and move the lever 258 with stop 256, out of the path of the tail end 255ª of the pawl 255 so as to allow the pawl, under the action of its spring, to engage the toothed wheel 253 and thereby connect the driving disk 254 and secondary driving shaft 226 to the main driving shaft 138 through the spur and worm gearing described. Immediately after the lever 264 has passed the catch 271, the lever 258 with stop 256 will return under the action of the spring 262, into a position to move the spring pawl 255 out of gear with the toothed wheel 253 and disconnect the secondary shaft 226 from the main driving shaft 138 after the disk 254 has made one complete revolution. When the said lever 264 is moved back into its normal position, it will not affect the lever 258 owing to the catch 271 being free to turn idly to the right. The lever 264 is fixed upon a spindle 265 to which is also fixed a toothed segment 266. This segment is in gear with a rack 268 fixed to an inclined bar 269 arranged to slide endwise in fixed guides 267 on the plate 133.

270 is a spring connected to the segment 266 and tending to move it and the rack 268 and bar 269 downward. The lever 264 moves idly in the direction of the arrow $x$ (Fig. 34) upon raising the slide bar 269 to start the machine, and when moved in the opposite direction, will act to withdraw the lever 258 and stop 256 from the disk 254 and pawl 255 respectively when the bar 269 is allowed to fall, which is caused to take place automatically only upon the completion of the forward movement of all of the nuts 40 by the feed screws 41, 41ª, 41ᵇ respectively. For the latter purpose, the sliding bar 269 when raised, is held in the raised position by three spring actuated pins 272, 273 and 274 (Figs. 34 and 35). The pins 272 and 274 are fixed to the blocks 215 secured to the rods 208 which are moved to the left by the nuts 40 of the screws 41, 41ᵇ against the action of the springs 130, the said pins being arranged to work in guide holes 275 in the plate 133 and to enter holes 276 and 278 respectively in the slide bar 269 after this bar is raised to start the machine. The pin 273 is carried by a block 279 (Figs. 34 and 35) fixed to the outer end of a rod 280 extending through the plate 133, the said pin being arranged to work through a hole 281 in the center guide 267 and to enter a hole 282 in the slide bar 269 by movement of the said rod 280 to the left after the bar is raised. The inner end of the said rod 280 is connected by a screw 283 to the left hand rod 208 which is moved to the right by the nut 40 of the screw 40ª abutting against the end of the rod 280.

With the arrangement described, when the bar 269 is fully raised so as to bring the holes 276, 282 and 278 opposite the pins 272, 273 and 274, the rods 208 and 280 will be moved endwise by the corresponding springs 130 and cause the pins to enter the holes and support the bar in the raised position, and will also move the levers 213 to cause the sleeves 109 of the reversible clutches to drive the feed screws 41, 41ª and 41ᵇ in a forward direction. When each of the nuts 40 has abutted against the pin 206 on the corresponding rod 208, or the inner end of the rod 280, and withdrawn the pins 272, 273 and 274 from the bar, the latter can fall and through the rack 268 and segment 266 turn the lever 264 in a direction to withdraw the lever 258 from the disk 254 and spring pawl 255 and allow the latter to engage the toothed wheel 253 and connect the disk 254 and secondary driving shaft 226 to the main driving shaft 138. It will be seen that upon the lever 264 being completely moved to the left it will release the lever 258 and permit the latter to return under the action of its spring 262. It has been found that unless means are adopted to prevent the lever 264 releasing the lever 258 too soon, the latter may return so quickly as to prevent the pawl engaging the toothed wheel 253. To obviate this, there is fixed to the lower end of the pin 259 to which the lever 258 is fixed, a lever 284 arranged to abut against a cam 285 on the inner side of the disk 254 and prevent the lever 258 being moved sufficiently far by the lever 264, as to enable the latter to be moved sufficiently to release the lever 258 and permit it to return, until after the released pawl 255 has had sufficient time to effectually engage the toothed wheel 253. After this has taken place the cam 285 will release the lever 284 and permit the lever 258 to be further moved by the lever 264 to a sufficient extent to allow the latter lever and bar 269 to be moved to their full extent and release the lever 258. This lever will then return and bring the stop 256 into a position to reëngage the tail 255ª of the pawl 255 and move the latter out of engagement with the toothed wheel 253, after one complete rotation of the disk 254 has taken place, and disengage the secondary driving shaft from the main driving shaft. The end of the lever 258 on its return movement, under the action of its spring, first meets the periphery of the disk 254, which acts as a stop therefor. The further movement of the said lever into the notch 254ª in the disk 254, which takes place after the rotation of the disk has ceased, causes the part of the screw stop 256 to slide up the inclined surface of the tail end of the pawl upon which it impinges and causes the point of the pawl to move quite clear of the toothed wheel 253. The engagement of the pawl at this time, with a pin or stop 286 on the disk 254, acts to lock the disk. 288 is a lever fixed to the spindle 265 and provided at its free end with an antifriction roller 289 adapted to be engaged by the outer surface of another cam 290 on the inner face of the disk 254 for insuring the complete movement of the arm 264 to the left after the cam 285 has released the arm 258. By this means the return of the arm 258 to the locking position is insured, so that the disk 254 can only make one revolution at each operation of the machine.

Means are or may be provided to prevent the type holder and type rising in the trough or guideway. In the example, springs 291 (Fig. 7) carried by supports 292 fixed to the plate 134 above the sets of space changing mechanism at A, B and C, serve to hold the type carriers vertically in place during the ejection of spaces from and the insertion of spaces in the line of type as hereinbefore described.

The operation of the machine is as follows:—Assuming that the main driving shaft 138 and driving spindles 91 are in operation and that type and spaces are being fed into the stationary trough 38 by the operation of an adjacent type setting machine, then, when the line of type approaches to within a certain length of the measured or justified line, the operator is warned of the fact by a signal in the usual way. He then notes the shortage in length and if unable to get more type in place without overrunning the required length of line, he applies the jaws of a type holder (Figs. 1 to 6), previously set to the proper measure, over the line of type. The starting bar 269 is then raised into a position to allow the pins 272, 273 and 274 to enter the holes in the bar and release the vertical levers 213 so as to permit the horizontal levers 108, under the action of their springs 130, to move the clutch sleeves 109 into gear with the clutch parts 110 and rotate the three feed screws 41, 41$^a$ and 41$^b$ in a forward direction. The lower feed screw 41, nut 40 and pusher 39 act to move the type holder and line of type to the left through the stationary trough 38 and the first set of space changing mechanism at A into the lower trough 139 of the left hand movable pair of troughs. The intermediate feed screw 41$^a$, nut 40 and pusher 39 at the same time move another type holder with line of type to the right from the upper trough 140 of the left hand movable pair of troughs through the second space changing mechanism at B into the lower trough 161 of the right hand movable pair of troughs. The upper feed screw 41$^b$, nut 40 and pusher 39 at the same time move another type holder with line of type to the left through the upper movable trough 162 of the last mentioned pair of troughs, through the upper space changing mechanism at C and into the guideway 165 of the galley 164. During the passage of each line of type through the several space changing mechanisms, spaces are ejected and replaced by thicker ones in the manner hereinbefore described until the line of type is justified, the cam 93 in each set of mechanism brought into operation, acting to open the reversing clutch 109, 110 and 111 of the corresponding feed screw, at the required times, to stop the line of type and enable such change of spaces to be effected. As each nut 40 arrives at the end of its operative travel, it actuates the clutch operating pin 206 and rod 208, or the rod 280, as the case may be, to cause the corresponding lever 213 to move the sleeve 109 of the corresponding reversing clutch into the mid or inoperative position and stop the feed screw, and at the same time remove the corresponding pin 272, 273 or 274 from the starting bar 269, this bar being permitted to automatically return to its normal position and bring the clutch stop 256 controlled thereby into position to release the spring pawl 255 and enable it to engage the toothed wheel 253 for connecting the secondary driving shaft 226 to the main driving shaft 138, only when all the nuts 40 have arrived at the ends of their operative strokes and the lines of type have been moved completely from one trough into the next adjacent trough. When this takes place, each of the three cam disks 220 driven from the secondary driving shaft 226 acts through the adjacent lever 108 to move the sleeve 109 of the corresponding reversing clutch 109, 110, and 111 from the mid position into engagement with the outer clutch part 111 so as to cause rapid backward rotation of the corresponding feed screw in order to move the nut with follower to its original position. Two of the cam disks 220 also act at this time to actuate the corresponding gearing 240, 241 and 155 and cause the trough changing mechanism to lift the lower trough 139 and 161 of each pair of troughs 139—140 and 161—162 into the upper position and lower the upper trough 140 and 162 of each pair of troughs into the lower position and bring them in line with the guideways 37 in the respective space changing mechanism, as hereinbefore described, the three cams 221 finally causing the sleeves 109 of the corresponding reversing clutches to move into their inoperative positions and stop the feed screws and also arresting the sets of trough changing mechanism. The bar 170 constituting the front side of the guideway 165 in the galley 164 and the type pusher 178—179 for the galley are also operated in succession by the means hereinbefore described to eject the justified line of type from the type holder in the galley guideway onto the galley and to resume their original positions during the single rotation of the secondary driving shaft 226. The main clutch is then automatically opened as hereinbefore described and the justifying portion of the machine brought to rest. The empty type holder is then removed from the type galley and applied to another underset line of type in the fixed type trough 38, the starting device 269 again moved to start the machine and the foregoing operations repeated. To prevent the gap finder 52 entering the gaps above an en quad at the end of each sentence and also at the ends of paragraphs, these quads are made a little higher than the ordinary spaces 57.

By the arrangement described, it will be seen that each line of type while going through the space changing process passes to and fro through the different space changing mechanisms. This is very important, as by this means the travel, and consequently the time of operation, is reduced according to the length of the line justified, that is to say the time occupied in justifying a line of type is, as it should be, proportional to its length, there being no idle travel of the line of type along a guideway after the end thereof has passed the space changing mechanism. The time occupied in transferring the line of type from one space changing mechanism to another is constant and therefore the instants at which the transference takes place vary with the length of line, although it happens that the transference occurs only when all the lines of type in the machine have passed their respective space changing mechanisms. Also, the space changing being done first at one end of the line and then at the other, the effect of the spacing upon a column of type when seen in printed matter is more pleasing than when done always at the same end of each successive line, and conforms more nearly to the rules adopted for hand justification. Another very important advantage obtained by the described arrangement of the troughs is that the machine can be made very compact and of small length.

What I claim is:—

1. A machine for the automatic justification of lines of type, comprising a guide way, means for feeding a line of type therealong, space ejecting means associated with the guideway, a device adapted to become temporarily locked with the line of type by entering a gap above the space separating a pair of types, means operated by said device for arresting the line of type as each space reaches a particular point while the line is underset and to set the space ejecting means in operation when the line is so arrested, and means for replacing the ejected space by one of greater thickness.

2. A machine for the automatic justification of lines of type, comprising in combination with space changing mechanism a guideway, an expansible holder between which the line of type to be justified is arranged, means for advancing the holder along the guideway, a device adapted to become temporarily locked with the line of type by entering a gap above the space separating a pair of types, means operated by the said device for arresting the line of type, an extension upon the device whereby the latter can be moved out of locking engagement with the line of type, and means associated with the holder adapted while the line of type is underset to pass the space changing mechanism without affecting the extension of the temporary locking device but to move, when the line of type has been correctly justified, to displace said extension and occupy a position such that during the remainder of its passage past the space changing mechanism, it prevents the device becoming again locked with the line of type.

3. A machine for the automatic justification of lines of type, comprising separated sets of space changing mechanism each having a guideway through which a line of type is adapted to be passed, means for passing such line of type successively through the several sets of space changing mechanism and means for transferring the line of type after it has passed one set of space changing mechanism into a position in alinement with the guideway of the set of space changing mechanism next in order.

4. A machine for the automatic justification of lines of type, comprising separated sets of space changing mechanism each having a guideway through which a line of type is adapted to be passed and means for passing the line of type through the several guideways successively in opposite directions.

5. A machine for the automatic justification of lines of type, comprising a number of sets of space changing mechanism, a typeline feeding device for each set thereof, means for simultaneously advancing the feed devices, means for individually arresting the feed devices at the end of their feeding motions and means for automatically returning them to their original position only after all of them have completed their feeding motions.

6. In a machine for the automatic justification of lines of type, spacing mechanism comprising a guideway, a channel in communication therewith, an ejector adapted to force a space from the line of type sidewise into such channel, a device for subsequently dragging the space lengthwise along the channel and another ejector adapted at a later stage to force the space sidewise out of the channel.

7. In a machine for the automatic justification of lines of type, the combination with spacing mechanism comprising a guideway, a channel in communication therewith, an ejector adapted to force a space from the line of type sidewise into such channel, a device for subsequently dragging the space lengthwise along the channel and another ejector adapted at a later stage to force the space sidewise out of the channel, of a trough arranged to receive the several spaces ejected from the channel aforesaid.

8. In a machine for the automatic justification of lines of type, the combination with a support having a guideway therein, of means for feeding a line of type along the guideway, a continuously driven shaft, a clutch for connecting the feeding means with the shaft, a slide adapted to be moved to open the clutch and arrest the feeding means, and a gap finder adapted when a space in the line of type, while underset, reaches such gap finder to connect the slide with the line of type and cause it to be moved thereby.

9. In a machine for the automatic justification of lines of type, the combination with a support having a guideway therein, of an expansible holder between which the line of type to be justified is arranged, means for feeding the holder along the guideway, a continuously driven shaft, a clutch for connecting the feeding means with the shaft, a slide adapted to be moved to open the clutch and arrest the feeding means, a gap finder carried by the slide and adapted to successively enter spaces in the line of type while the latter is underset so that the slide is moved thereby, and means associated with the holder adapted to hold the gap finder in inoperative position after the line of type has been justified.

10. In a machine for the automatic justification of lines of type, the combination with a support having a guideway along which a line of type is adapted to be passed, of a main slide movable in the direction of the guideway, a transverse slide carried by the main slide and adapted to extend into the guideway, means normally urging the transverse slide into such guideway, a gap finder movable in a direction parallel to the transverse slide and a yielding connection between the latter and the gap finder, the transverse slide while a line of type is passing it causing the gap finder to press against the various types but to shoot into the gap above a space between the types and lock the main slide thereto.

11. In a machine for the automatic justification of lines of type, the combination with a support having a guideway therein, of an expansible holder between which the line of type to be adjusted is arranged, means for feeding the holder along the guideway, a continuously driven shaft, a clutch for connecting the feeding means with the shaft, a main slide movable in the direction of the guideway, a transverse slide carried by the main slide and adapted to extend into the guideway, means normally urging the transverse slide into such guideway, a gap finder movable in a direction parallel to the transverse slide and a yielding connection between the latter and the gap finder, the transverse slide while a line of type is passing it causing the gap fined to press against the various types but to shoot into the gap above a space between the types and lock the main slide thereto, an extension upon the gap finder and cut out mechanism associated with the expansible holder adapted to pass the gap finder inoperatively as long as the line of type is underset but to be displaced to re-act upon the extension of the gap finder when the line of type is justified to retract the gap finder and render it inoperative during the remainder of the passage of the line of type.

12. In a machine for the automatic justification of lines of type, the combination with a support having a guideway therein, of a channel in communication with an opening in the side thereof, an ejector adapted to force a space from the line of type sidewise into such channel, a device for subsequently dragging the space lengthwise along the channel, a second ejector adapted at a later stage to force the space sidewise out of the channel, a channel in communication with the bottom of the guideway and a lifter for forcing a thicker space up into the guideway to replace the space ejected from the line of type.

13. In a machine for the automatic justification of lines of type, the combination with a support having a guideway therein along which a line of type is adapted to be fed, of a channel in communication with an opening in the side thereof, an ejector adapted to traverse the guideway and force a space into one end of the said channel, a second ejector adapted to force a space sidewise from the channel at the opposite end, a channel in communication at one end with the bottom of the guideway, a trough containing substitute spaces in communication with the other end of the last named channel, a space lifter for advancing a substitute space therealong into the guideway and a hook adapted to engage and drag an ejected space along its channel with return movement of the lifter.

14. In a machine for the automatic justification of lines of type, the combination with a support having a guideway therein along which a line of type is adapted to be fed, of a channel in communication with an opening in the side thereof, an ejector adapted to traverse the guideway and enter one end of said channel, a second channel in communication with the bottom of the guideway, a space-containing trough in communication with the second channel, a carrier adapted to be reciprocated in a direction parallel to both channels, a space lifter on said carrier arranged to slide in the second channel, a drag hook associated with the first named channel also mounted on said carrier, a second space ejector traversing the first named channel and having a pin and slot connection with the carrier, cam and lever mechanism for operating the first named ejector, and cam and lever mechanism for operating the carrier, the said cams and the pin and slot connection between the carrier and second named ejector being such that a space to be ejected is first forced by the first named ejector into its channel, the said ejector then arrested, the space lifter partially advanced to force a substitute space partially into the guideway, the first named ejector next retracted, the carrier restarted to completely force the substitute space into the guideway and simultaneously operate the second named ejector to force from the channel a previously ejected space and the carrier finally returned to first cause the second named ejector to be moved to its normal position and then the space immediately ejected into the channel to be dragged therealong by said drag hook.

15. In a machine for the automatic justification of lines of type, the combination with a support having a guideway therein and means, including a screw, for feeding a line of type therealong, of a continuously driven shaft, gearing that includes a clutch for driving the screw from such shaft, a cam mounted loosely on the latter, means moved by the cam to open the said clutch, a second clutch on the shaft aforesaid, a slide adapted to be moved by the line of type to a limited extent every time a space that requires to be ejected passes a predetermined point and clutch actuating gear adapted to be operated by the slide so as to close the second clutch, and cause the cam to be rotated and open the clutch controlling the feed screw.

16. In a machine for the automatic justification of lines of type, the combination with a continuously driven shaft, of a feed screw, a clutch member loosely mounted on the shaft, gearing connecting the clutch member to the feed screw, a co-acting clutch member feathered on the shaft, actuating gear controlling the co-acting clutch member, a second clutch member loosely mounted upon the shaft, a co-acting clutch member therefor feathered on the shaft, means for engaging and disengaging the last two clutch members and a cam on the second clutch member that is normally loose on the shaft, adapted when the said member is clutched thereto to operate the actuating gear of the first clutch and hold the latter open during a complete revolution of the shaft.

17. In a machine for the automatic justification of lines of type, the combination with a support having a guideway therein, of means for feeding a line of type along the guideway, a continuously driven shaft, a clutch for connecting the feeding means with the shaft, a slide adapted to be moved to open the clutch and arrest the feeding means, a gap finder adapted when a space in the line of type, while underset, reaches such gap finder to connect the slide with the line of type and cause it to be moved thereby, a lever adapted to move the gap finder and a cam driven from the shaft adapted to actuate the lever and move the gap finder out of engagement with the line of type as soon as the said shaft has made a complete revolution after arrest of the line of type.

18. In a machine for the automatic justification of lines of type, the combination with a support having a guideway therein, of an expansible holder between which the line of type to be justified is arranged, means for feeding the holder along the guideway, a continuously driven shaft, a clutch for connecting the feeding means with the shaft, a slide adapted to be moved to open the clutch and arrest the feeding means, a gap finder carried by the slide and adapted to sucessively enter spaces in the line of type while the latter is underset so that the slide is moved thereby, a lever adapted to move the gap finder, a cam driven from the shaft adapted to actuate the lever and move the gap finder out of engagement with the line of type as soon as the shaft has made a complete revolution after arrest of the line of type, and means associated with the holder adapted to hold the gap finder in inoperative position after the line of type has been justified.

19. In a machine for the automatic justification of lines of type, the combination with a support having a guideway therein of an independently operated space ejector, a conjointly operated space lifter and drag hook, a continuously driven shaft, cam mechanism adapted to operate the said space ejector and space lifter and drag hook, and a clutch adapted to intermittently connect the cam mechanism with the shaft and disconnect it.

20. In a machine for the automatic justification of lines of type, the combination with a support having a guideway therein along which a line of type is adapted to be fed, of a channel in communication with an opening in the side thereof, an ejector adapted to traverse the guideway and enter one end of said channel, a second channel in communication with the bottom of the guideway, a space-containing trough in communication with the said channel, a carrier adapted to be reciprocated in a direction parallel to both channels, a space lifter on said carrier arranged to slide in the second channel, a drag hook associated with the first named channel also mounted on said carrier, a second space ejector traversing the first named channel and having a pin and slot connection with the carrier, lever mechanism connected with the first named ejector, lever mechanism connected with the carrier, a set of cams coöperating with the said lever mechanisms, a continuously driven shaft, means for clutching the set of cams thereto, a slide adapted to operate the clutching means, and a gap finder upon the slide adapted to enter the gap above a space in an underset line of type as it passes along the guideway and cause the latter to move the slide and operate the clutching means.

21. In a machine for the automatic justification of lines of type, the combination with a support having a guideway therein along which a line of type is adapted to be fed, of a channel in communication with an opening in the side thereof, an ejector adapted to traverse the guideway and enter one end of said channel, a second channel in communication with the bottom of the guideway, a space-containing trough in communication with the second channel, a carrier adapted to be reciprocated in a direction parallel to both channels, a space lifter on said carrier arranged to slide in the second channel, a drag hook associated with the first named channel also mounted on said carrier, a second space ejector traversing the first named channel and having a pin and slot connection with the carrier, lever mechanism connected with the first named ejector, lever mechanism connected with the carrier, a set of cams coöperating with the said lever mechanisms, a continuously driven shaft, means for clutching the set of cams thereto, a slide adapted to operate the clutching means, a gap finder upon the slide adapted to enter the gap above a space in an underset line of type as it passes along the guideway and cause the latter to move the slide and operate the clutching means, a lever adapted to move the gap finder, and a cam moving with the set of cams aforesaid adapted to actuate the lever and move the gap finder out of engagement with the line of type as soon as the shaft has made a complete revolution after arrest of the line of type.

22. In a machine for the automatic justification of lines of type, the combination with a support having a guideway therein, of an expansible holder between which the line of type to be justified is arranged, means for feeding the holder along the guideway, a channel in communication with an opening in the side thereof, an ejector adapted to traverse the guideway and enter one end of said channel, a second channel in communication with the bottom of the guideway, a space-containing trough in communication with the second channel, a carrier adapted to be reciprocated in a direction parallel to both channels, a space lifter on said carrier arranged to slide in the second channel, a drag hook associated with the first named channel also mounted on said carrier, a second space ejector traversing the first named channel and having a pin and slot connection with the carrier, lever mechanism connected with the first named ejector, lever mechanism connected with the carrier, a set of cams coöperating with the said lever mechanisms, a continuously driven shaft, means for clutching the set of cams thereto, a clutch normally connecting the feeding means with the shaft, a slide adapted to be moved to operate the means for clutching the set of cams to the shaft and to open the feed clutch, and a gap finder carried by the slide and adapted to successively enter spaces in the line of type while the latter is underset so that the slide is moved thereby.

23. In a machine for the automatic justification of lines of type, a type holder comprising a body frame adjustable in length, a jaw fixed thereto, a jaw movable in relation to the fixed jaw, means urging the movable jaw toward the fixed jaw, and a cut out device carried by the body frame and adjustable in length with the latter.

24. In a machine for the automatic justification of lines of type, a type holder comprising a body frame, a jaw fixed thereto, a jaw movable in relation to the fixed jaw, a spring urging the movable jaw toward the fixed jaw, a cut out frame movable about an axis parallel to the body frame, a spring urging the cut out frame to occupy one position, and a pin movable with the movable jaw adapted to determine such position until the jaw reaches a definite point in its travel when it becomes disengaged from the cut out frame and allows the spring to alter the position of the latter.

25. In a machine for the automatic justification of lines of type, a type holder comprising a two part body frame, means for adjusting the length of such frame, a jaw fixed to one frame part, a jaw movable along the other frame part, a spring urging the movable jaw toward the fixed jaw and a two part adjustable cut out frame mounted to move about an axis parallel to the body frame and controlled in position by the movable jaw.

26. In a machine for the automatic justification of lines of type, the combination with a support having a guideway therein along which a line of type is adapted to be fed, of a feeding screw for feeding said line of type, a continuously driven shaft, a reversing clutch on the latter and gearing, alternately operated with reversal of clutch closure, adapted to reverse the direction of rotation of the feed screw.

27. In a machine for the automatic justification of lines of type, the combination with a support having a guideway therein along which a line of type is adapted to be fed, of a feeding screw for feeding said line of type, a continuously driven shaft, a reversing clutch on the latter and gearing, alternately operated with reversal of clutch closure, adapted to rotate the screw in feeding direction at one speed and to return it at a higher speed.

28. In a machine for the automatic justification of lines of type, the combination with a support having a guideway therein along which a line of type is adapted to be fed, of a feeding screw for feeding said line of type, a nut movable therealong a continuously driven shaft, two loose clutch members on the latter, gearing connected with one clutch member adapted to drive the feeding screw in one direction, gearing connected with the other clutch member adapted to drive the feeding screw in the reverse direction, a clutch member feathered on the shaft and adapted to alternately engage the loose clutch members and means operated by the nut when it reaches the end of the feeding screw for bringing the feathered clutch member into mid position and arrest the feeding screw.

29. In a machine for the automatic justification of lines of type, the combination with a support having a guideway therein along which a line of type is adapted to be fed, of a feeding screw for feeding said line of type, a nut movable therealong, a continuously driven shaft, two loose clutch members on the latter, gearing connected with one clutch member adapted to drive the feeding screw in one direction, gearing connected with the other clutch member adapted to drive the feeding screw in the reverse direction, a clutch member feathered on the shaft and adapted to alternately engage the loose clutch members, means adapted to move the feathered clutch member into engagement with the member of the screw feeding gear at starting, a main driving shaft, a secondary shaft adapted to be connected to the main driving shaft, clutch mechanism serving to connect the main and secondary shafts, cam mechanism adapted to be driven from the secondary shaft to engage the feathered clutch member with the clutch member of the gear for reversing the feed screw and return it after a predetermined time to mid position, means operated by the nut when it reaches the end of its forward travel adapted to move the feathered clutch member into mid position to arrest the feeding screw, and a bar adapted to actuate the clutch mechanism pertaining to the main and secondary driving shafts to disengage the same at starting, means for locking the bar in starting position and adapted, when the nut on the feeding screw reaches the end of its forward travel to move the clutch to mid position, to be simultaneously moved to liberate the starting bar and permit the clutch controlled thereby to be operated to set in motion the screw reversing gear.

30. In a machine for the automatic justification of lines of type, the combination with a main driving shaft, of a second shaft, means such as chain and sprocket gear enabling the said second shaft to be continuously driven from the main shaft, a feed screw adapted to be driven from the said second shaft, two loose clutch members on the latter, gearing connected with one clutch member adapted to drive the feed screw slowly in one direction, gearing connected with the other clutch member adapted to drive the feed screw faster in the reverse direction, a clutch member feathered on the second shaft, a normally idle secondary driving shaft adapted to be clutched to the main driving shaft, clutch mechanism for the latter purpose, a lever for shifting the feathered clutch member aforesaid into engagement with the co-acting loose members alternately, a spring influenced lever tending to force the feathered clutch member into engagement with the low speed gear of the feed screw, means operated by the latter adapted to move the lever and shift the feathered member into mid position when the feed screw is to be arrested, cam mechanism adapted to be driven from the secondary shaft, means connecting the cam with the lever operating the feathered clutch member, a bar adapted to be moved at starting without affecting the clutch mechanism for connecting the main and secondary shafts, means for holding the bar in the position into which it is moved, means operated by the feed screw for releasing the bar simultaneously with movement of the clutch lever into mid position, and means operated by the bar when released for closing the clutch mechanism connecting the main and secondary driving shafts.

31. In a machine for the automatic justification of lines of type, the combination with a feed screw, of a continuously driven main shaft, a second shaft, means such as chain and sprocket gear connecting the latter shaft to the main shaft, a forward and a reverse clutch element both loosely mounted on the second shaft and connected to the feed screw, a companion clutch member feathered on the second shaft, a lever for operating the said clutch member and an intermittently operated adjustable cam engaging the clutch lever and adapted to move the feathered clutch member into engagement with the reverse clutch member and maintain such engagement for a predetermined time.

32. In a machine for the automatic justification of lines of type, the combination with a feed screw, of a continuously driven main shaft, a second shaft, means such as chain and sprocket gear connecting the latter shaft to the main shaft, two clutch elements loosely mounted on the second shaft, forward driving gear connecting one clutch member with the feed screw, reverse driving gear of a faster character connecting the other clutch member with the feed screw, a companion clutch member feathered on the second shaft, a lever for operating the said clutch member and an intermittently operated adjustable cam engaging the clutch lever and adapted to move the feathered clutch member into engagement with the reverse clutch member and maintain such engagement for a predetermined time.

33. In a machine for the automatic justification of lines of type, the combination with a feed screw, of a continuously driven main shaft, a second shaft, means such as chain and sprocket gear connecting the latter shaft to the main shaft, a forward and a reverse clutch element both loosely mounted on the second shaft and connected to the feed screw, a companion clutch member feathered on the second shaft, a lever for operating the said clutch member, an intermittently operated adjustable cam engaging the clutch lever and adapted to move the feathered clutch member into engagement with the clutch member of the reverse driving gear and a cam adapted to return the feathered clutch member to mid position after a predetermined time.

34. In a machine for the automatic justification of lines of type, the combination with a feed screw, of a constantly rotating main driving shaft, a secondary shaft, a notched driving disk upon the latter, a ratchet wheel independent of the disk but arranged coaxially with the secondary shaft, gearing connecting such ratchet wheel to the main shaft, a pawl carried by the driving disk, a lever adapted to engage the periphery of the disk and to enter the notch therein, an adjustable stop on the lever adapted when the latter enters the disk notch to disengage the pawl from the ratchet wheel, means for withdrawing the lever from the notch to allow the pawl to engage the ratchet wheel and drive the secondary shaft and clutch mechanism, associated with the feed screw, actuated by the said secondary shaft.

35. In a machine for the automatic justification of lines of type, the combination with a feed screw, a constantly rotating main driving shaft and a secondary shaft, of a notched driving disk upon the latter, a ratchet wheel independent of the disk but arranged coaxially with the secondary shaft, gearing connecting said ratchet wheel to the main shaft, a pawl carried by the driving disk, a lever adapted to engage the periphery of the disk and to enter the notch therein, an adjustable stop on the lever held while the latter engages the periphery of the disk out of engagement with the pawl but adapted to engage the pawl and force it away from the ratchet wheel when the lever enters the notch in the disk, a one way acting catch on the lever, a pivoted lever adapted to coöperate with the said catch, a toothed segment connected to the said pivoted lever, a sliding bar, a rack on the bar engaging the segment to cause the said pivoted lever to be oscillated in one direction idly past the one way acting catch and in the opposite direction so as to move the stop lever out of the notch in the driving disk and clutch mechanism, associated with the feed screw, actuated by the secondary shaft aforesaid.

36. In a machine for the automatic justification of lines of type, the combination with a plurality of feed screws of a corresponding number of shafts, a constantly rotating main shaft, means such as chain and sprocket gearing connecting the main and other shafts, clutch mechanisms adapted to connect the several feed screws to the corresponding shafts alternately through forward and reversing gear, a secondary shaft, clutch mechanism adapted to connect same to the main shaft, a perforated sliding bar, adapted to be moved in one direction without operating the clutch mechanism pertaining to the secondary shaft, locking devices adapted to enter the perforation in the bar and hold it in the position into which it is moved and means operated by the feeding screws adapted to independently withdraw the locking devices, the sliding bar moving after all have been withdrawn to close the clutch and start the secondary shaft.

37. In a machine for the automatic justification of lines of type, the combination with a support having a horizontal guideway along which a line of type is adapted to be fed, of a holder bodily removable from the guideway within which the line of type is arranged, a trough in alinement with the said guideway adapted to receive the holder and line of type held thereby, a galley associated with the trough and means for transferring the holder and line of type from the trough to the galley.

38. In a machine for the automatic justification of lines of type, the combination with a support having a horizontal guideway along which a line of type is adapted to be fed, of a holder, bodily removable from the guideway within which the line of type is arranged, a trough in alinement with the said guideway adapted to receive the holder and line of type, a vertically movable front wall for said trough, a galley separated from the trough by such front wall, a pusher arranged above and behind the trough, means for lowering the front wall of the trough after the holder and line of type have been fed into the trough and means for subsequently operating the pusher to force the holder and line of type from the trough into the galley.

39. In a machine for the automatic justification of lines of type, the combination with a support having a horizontal guideway along which a line of type is adapted to be fed, of a holder, bodily removable from the guideway within which the line of type is arranged, a trough in alinement with the said guideway adapted to receive the holder and line of type, a vertically movable front wall for said trough, a galley separated from the trough by such front wall, a pusher arranged above and behind the trough, a constantly rotating main driving shaft, a secondary shaft intermittently connected to the main shaft, a set of cams driven from the secondary shaft and levers, coöperating with such cams, connected respectively to the front wall of the trough and the pusher, the front wall being first lowered and the pusher afterward advanced to force the holder and line of type from the trough to the galley.

40. In a machine for the automatic justification of lines of type, the combination with separate sets of space changing mechanism and means for moving lines of type therethrough, of pairs of movable troughs one trough of each pair adapted to receive a line of type from one set of space changing mechanism while a line of type is being fed from the other trough of said pair through the next set of space changing mechanism and means for interchanging the positions of such troughs.

41. In a machine for the automatic justification of lines of type, a pair of troughs, a pair of guides associated with each trough, endless carriers connecting the troughs and adapted to transfer each trough from the region of one pair of the guides to the other, means extending from the troughs into the guides for holding the troughs upright while moving in the region of their guides, and gearing rendered operative to maintain the troughs upright while passing from the region of one pair of guides to another.

42. In a machine for the automatic justification of lines of type, a pair of troughs, a pair of guides associated with each trough, endless carriers connecting the troughs and adapted to transfer each trough from the region of one pair of the guides to the other, means connected with the troughs for holding the troughs upright while moving in the region of their guides, comprising a pair of meshing gear wheels which are carried by each trough and a stationary toothed segment associated with each pair of such gear wheels and arranged to be engaged thereby and to maintain the troughs upright during their passage from the region of one pair of guides to the other.

43. In a machine for the automatic justification of lines of type, a pair of troughs, a pair of guides associated with each trough, endless carriers connecting the troughs and adapted to transfer each trough from the region of one pair of the guides to the other, a shaft operating said endless carriers, an intermittently rotating driving shaft and gearing connecting both shafts.

44. In a machine for the automatic justification of lines of type, a pair of troughs, a pair of guides associated with each trough, endless carriers connecting the troughs and adapted to transfer each trough from the region of one pair of the guides to the other, a shaft operating said endless carriers, an intermittently rotating driving shaft, gearing connecting both shafts and means for adjusting the angular relationship between the gearing and the shaft to which the endless carriers are connected.

45. In a machine for the automatic justification of lines of type, a pair of troughs, endless carriers therefor, a main driving shaft, a secondary driving shaft, clutch mechanism for intermittently connecting the main and secondary shafts, a sleeve driven by the secondary shaft, a trough changing shaft to which the endless carriers are connected and gearing connecting the sleeve and trough changing shaft.

46. In a machine for the automatic justification of lines of type, space changing mechanism comprising a guideway for the line of type to be justified, a type holder with cut out device for holding the line of type during justification thereof, feeding mechanism for traversing a line of type with its holder through the said guideway, a slide adapted to be displaced upon a line of type with its holder entering the guideway, a gap finder arranged to be acted upon by the displaced slide and adapted, when not restrained by the cut out device of the type holder, to enter the gap above each space in the line of type when such gap is brought opposite to it and to be moved sidewise to a limited extent by the line of type, a space ejector for ejecting the space below the gap, a space lifter for replacing the ejected space by a thicker one, means for then withdrawing the gap finder from the line of type, means for putting the feeding mechanism in and out of operation, a set of cams adapted to operate the space ejector, space lifter, withdrawing means for the gap finder and the means for causing the feeding mechanism to be put out of and into operation at the required times, a driving spindle and a clutch device adapted to put the cams into driving connection with the driving spindle when the gap finder is moved laterally by the line of type and to disconnect the cams from the spindle after the gap finder is withdrawn from the line of type and allowed to resume its original sidewise position, substantially as described.

47. A machine for the automatic justification of lines of type, comprising a number of sets of space changing mechanism, feeding devices for moving lines of type through the several sets of space changing mechanism, sets of trough changing mechanism each adapted to move a line of type from opposite one set of space changing mechanism to the next adjacent set thereof, a main driving shaft from which the driving spindles of the sets of space changing mechanism are continuously driven, a secondary driving shaft, a starting device, reversible clutch operated driving mechanism for each feeding device, such mechanism comprising a lever tending to put the clutch in position to drive the corresponding feeding device in a forward direction, means, under the control of each space changing mechanism, adapted to open the clutch when the space changing mechanism is brought into action and to permit the clutch to close when the space changing mechanism is stopped, separate operating means under the control of the starting device and of the feeding devices for putting the sets of reversible clutch operated driving mechanism into operation when the starting device is operated to start the machine, to separately hold the starting device in the starting position against a force tending to move it into the inoperative position, and to automatically put each set of clutch operated driving mechanism out of action and to release its hold of the starting device when the corresponding feeding device has completed its forward travel, sets of cam mechanism corresponding to the sets of feeding mechanism and to the sets of reversible clutch operated driving mechanism, each set of cam mechanism being driven from the secondary driving shaft and adapted, when brought into operation, to first close the clutch of the corresponding reversible driving mechanism to cause reverse motion of the feeding device and to afterward open the clutch and stop the feeding device, and some of the sets of cam mechanism being adapted to operate the trough changing mechanism, a main clutch adapted, on the complete automatic release of the starting device, to automatically connect the secondary driving shaft to the main driving shaft for operating the sets of cam mechanism, and controlling means adapted to open the main clutch when the secondary driving shaft has been rotated to a predetermined extent.

Signed at Pulsometer Eng. Works Reading, Berks. England this 31st day of October 1910.

EDWARD AUGUSTUS ADCOCK.

Witnesses:
GEORGE ENOS KENNEY,
FRANCIS CHARLES BABBAGE.

---

Copies of this patent may be obtained for five cents each, by addressing the "Commissioner of Patents. Washington, D. C."